US007100123B1

(12) United States Patent  (10) Patent No.: US 7,100,123 B1
Todd et al.  (45) Date of Patent: *Aug. 29, 2006

(54) ELECTRONIC CONTENT SEARCH AND DELIVERY BASED ON CURSOR LOCATION

(75) Inventors: Ian H. Todd, Seattle, WA (US); Kevin Sukmin Son, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 649 days.

This patent is subject to a terminal disclaimer.

(21) Appl. No.: 10/057,433

(22) Filed: Jan. 25, 2002

(51) Int. Cl.
 *G06F 17/30* (2006.01)
 *G06F 7/02* (2006.01)
 *G06F 7/04* (2006.01)

(52) U.S. Cl. ............ 715/862; 715/532; 715/533; 715/711; 715/856; 715/768
(58) Field of Classification Search .......... 715/711, 715/531, 768, 856, 859, 532, 533, 537
 See application file for complete search history.

(56) References Cited

U.S. PATENT DOCUMENTS

| 5,642,522 | A | * | 6/1997 | Zaenen et al. | 715/532 |
| 5,651,107 | A | * | 7/1997 | Frank et al. | 715/768 |
| 6,393,443 | B1 | * | 5/2002 | Rubin et al. | 715/533 |
| 6,662,152 | B1 | * | 12/2003 | Sako et al. | 704/9 |

FOREIGN PATENT DOCUMENTS

WO    WO 01/13245 A1    2/2001

OTHER PUBLICATIONS

Microsoft Computer Dictionary Fifth Edition, 2002, Microsoft Press, p. 348.*
Plachy, Johannes. "The Portable Executable File Format". Aug. 25, 1997, pp. 1 and 13.*
Baird, Leemon. Class Display, Jul. 24, 1996, p. 5.*
"Atomica Enterprise Platform," in Atomica Corporation Website: http://www.atomica.com/solutions_platform.html, 7 pp.
Pop-up Dictionary "Dr. Mouse," in Ichitaro Information Center/ Shin Shin America Website: http://www.shinshin.net/justsystem/en/new.html, 4 pp.
"Babylon-Enterprise: The Components," in Babylon.com Website: http://www.babylon.com/corp/components.html, 7 pp.
"Virus Alert!" in PCWORLD Website: printed Jan. 14, 2002. http://www.pcworld.com/resource/printable/article/0,aid,59643,00.asp, 1 pg.

* cited by examiner

*Primary Examiner*—Raymond J. Bayerl
*Assistant Examiner*—Namitha Pillai
(74) *Attorney, Agent, or Firm*—Ronald M. Anderson

(57) ABSTRACT

An electronic search is automatically initiated when a cursor hovers in one location for a predetermined time. A target process associated with a target window is forced to re-render data to the target window in an update region that includes the detected cursor location. From the re-rendered data, a primary word and context words near the cursor location are determined. One or more local or remote electronic data stores are searched for substantive content related to the words. The content is prioritized according to user preference and displayed in a semitransparent window that is persistently visible to a user, yet does not obscure other content in an underlying window and does not shift the focus from an active window. Re-rendering is accomplished by invalidating an update region of the target window, and forcing the operating system to issue a paint message, causing the target process to redraw the update region.

36 Claims, 12 Drawing Sheets

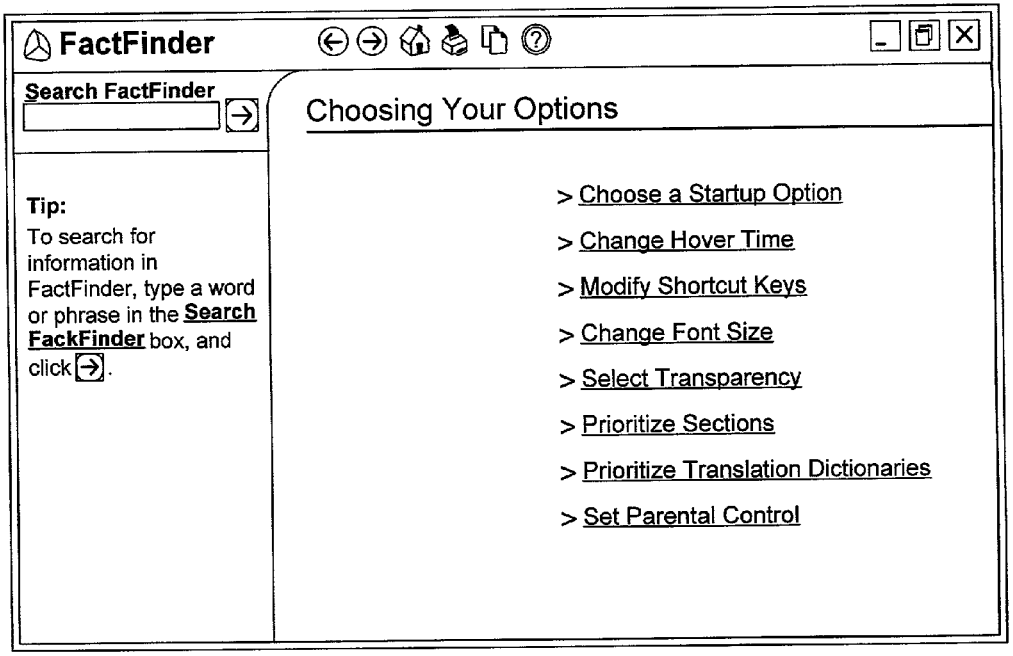
300b  FIG. 12
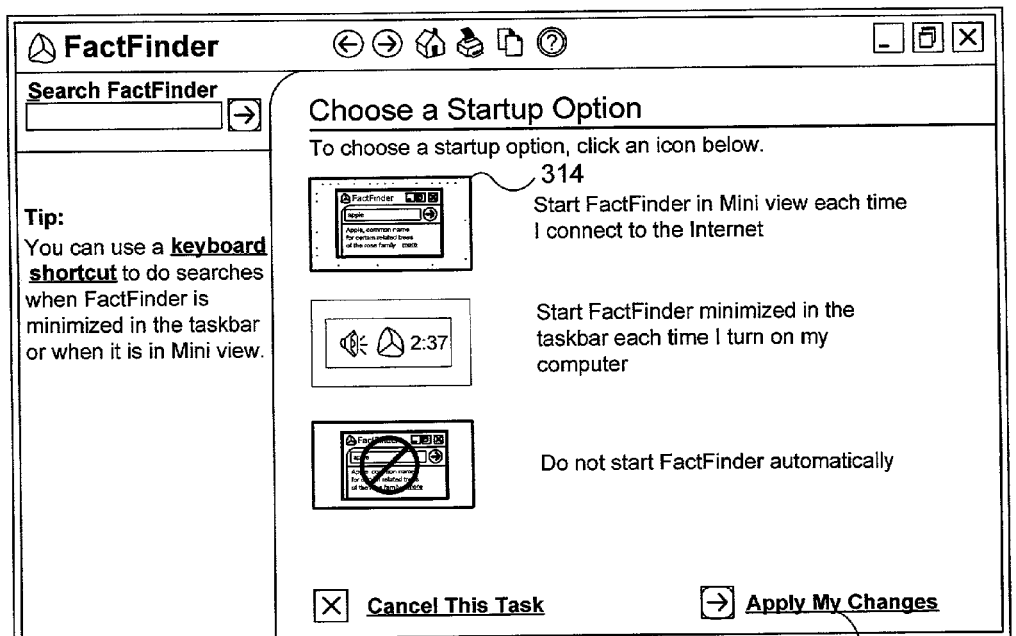
300c  FIG. 13

ELECTRONIC CONTENT SEARCH AND DELIVERY BASED ON CURSOR LOCATION

FIELD OF THE INVENTION

The present invention generally relates to providing substantive information about a word or words designated by a user, and more specifically, to automatically providing the substantive information in response to a user hovering a cursor controlled by a pointing device over the text word or words.

BACKGROUND OF THE INVENTION

Electronic content search and delivery typically involves accessing one or more data stores to obtain content about a requested subject, and providing the content in a manageable form to a user. There are a number of electronic content search and delivery models currently in use. For example, a common Web search model accesses a number of servers and provides a list of links related to keywords entered by a user. Commercial products implementing the Web search model, such as YAHOO!™ and GOOGLE™, are well known. A localized reference model accesses one or more local data stores of content and provides definitions, synonyms, language translations, summaries, or other substantive content related to keywords identified by a user. Commercial products implementing the local reference model include Microsoft Corporation's BOOKSHEL™ 2000. A third model accesses offline or online help information and provides a pop-up box to explain software features, evaluate spelling of text, or provide other brief information. Commercial products implementing the help model include Microsoft Corporation's OFFICE ASSISTANT™, HELP VIEWER™ and TOOLTIPS™.

Combinations of the above models are also available. Some resemble the Web search model, but include aspects of the help model. For example, a product called QUICK-CLICK™ (formerly FLYSWAT™—no longer available) evaluated the text of a downloaded Web page and automatically provided links to other Web pages for terms and phrases recognized on the downloaded Web page. Each recognized term and phrase on the Web page was changed to a different color text and associated with a link. A user could then click on one of the colored terms or phrases to be linked to another Web page.

Another commercial product, which is provided by ATOMICA Corporation and called ATOMICA™, extends the Web search model to provide an online version of the localized reference model. This product provides substantive information, rather than links to substantive information, although one option enables a user to search the Web for related information. Although originally owned and commercialized under a different name, details of the product are disclosed in International patent application, publication number WO 01/13245 A1. The ATOMICA software requires software to be downloaded and installed on a user's computer (i.e., on a client computer). When running, the ATOMICA software enables the user to designate a text item displayed in an active window of another software program, such as a word processor, an email program, a browser, a spreadsheet program, etc. ATOMICA retrieves substantive information about the designated text item from an online database and then provides the substantive information through a customized browser window.

As indicated above, the ATOMICA software must be downloaded from a specific Web site and installed by the user on a client computer, based upon an affirmative decision by the user to install the product. A user will likely not know that the software is available, unless informed by another user or by reading a publication that describes the software and indicates where it can be downloaded. Thus, the very existence of this software is somewhat difficult for a user to determine. Even if the ATOMICA software is preinstalled and set to automatically load upon startup of the user's computer, it may not be readily apparent to the user how to activate the software. The ATOMICA software may be set to automatically display a semi-persistent "answer bar." The answer bar is a small window with a drop-down text box. When the answer bar initially appears, the drop-down box is empty, so the user cannot make any selection. The answer bar also does not provide any substantive content. Instead, by trial and error, the user may determine that text can be entered into the drop-down box. It is the user's entries that are then listed in the drop-down box.

However, there is no indication that a user may designate a word in another window. The answer bar may attract the user to type in a word, but the answer bar does not indicate that the ATOMICA software enables a user to initiate a search with a key-click combination. By default, the ATOMICA software requires a user to activate the software by designating a word in a window and then actuating a mouse button while holding down one or more specific keys on the user's keyboard that the user must remember. To determine how to designate a word and activate the software, the user must read instructions, or learn from another user. Because the ATOMICA software does not make it apparent to a novice user how to activate or use the software, its use is also somewhat difficult to discover.

Once the user is aware of the software and determines how to activate the software, the user may find it difficult to remember how to use the software. Specifically, the user may find it difficult to remember the specific key(s) that must be held down and the mouse button that must be pressed at the same time to activate the ATOMICA software to obtain information on a word or phrase. The user may manually simplify word designation by choosing an option to press only the right mouse button without having to hold down a key at the same time. However, the user must first determine how to find and select this option, and be willing to forgo using the selected mouse button for all other purposes. For example, the right mouse button is often used by many software programs to provide a pop-up menu of frequently used functions, such as cut, copy, and paste commands. If the user selects the right mouse button to designate a word for the ATOMICA software, the user loses the pop-up menu of functions.

Although not currently implemented in the publicly available ATOMICA software, International patent application, publication number WO 01/13245 A1, which is assigned to Atomica Corporation, indicates that a user may place a cursor on a word and wait a specified amount of time to indicate that further information is desired about the designated word. However, the publication provides no enabling detail regarding this point-and-wait indication to obtain information.

In the context of clicking on a text item with a mouse, the above international publication indicates that the ATOMICA software determines a word or words from the designated text item by utilizing a text-grabbing algorithm, such as that described in U.S. patent application Ser. No. 09/127,981 and/or an optical character recognition (OCR) algorithm. Knowing the position indicated by the pointing device, the software installed on the user's computer requests information from the application program that has displayed the text item. According to the international publication, the software receives the word from the application program, "perhaps using an application programming interface (API)." No further detail is provided. Alternatively, if the text is transmitted in a separate data stream, such as a data stream associated with a video stream, the international publication indicates that the program may retrieve the text directly from the separate data stream, rather than determining the word or words from display. The publication provides no further detail on the above word determination techniques. As described in this reference, the program also draws context-indicating words from the body of text, typically from the same sentence as that including the designated word, and/or from a title of the body of the text. The International patent application publication number WO 01/13245 A1 indicates that the user's computer sends a list of words from the body of the text, including the designated word, to a server. For example, if a user clicked on the word "stock," which was followed in the sentence by the word "broker," the user's computer would send a list of words including "stock" and "broker." The international publication does not provide any further detail on how the software on the user's computer extracts or determines the context-indicating words to send to the server.

Once the user's computer sends the list of words to the server, the server runs a context-determination algorithm to determine a context of the designated word. Once the proper context is determined, a program running on the server searches online data stored on the server or other machines comprising a network. The server appears to first search for data regarding multiple words. If no matches are found for the multiple words, the server then searches for the single designated word. There does not appear to be any way to modify or override this search order. The user also does not have any control over the data resources that are searched by the server, or any way to prioritize the type of data that are more relevant to the user. For example, the user cannot choose to receive medical data before business data, if a designated word, acronym, or other text, has multiple different meanings in each of these two fields of interest.

The results of the search are then passed by the server back to the user's computer. Although the online database perhaps provides updated information, because of the product's complete dependence on Internet communication and remote processing of selected text, the server is relatively slow to respond compared to the response time for a localized reference model that does not need to communicate over the Internet.

When the information arrives from the server, it is displayed in a customized browser window. Specifically, the ATOMICA product requires that Microsoft Corporation's INTERNET EXPLORER™ (IE) version 4 or higher be installed on the user's system, because the ATOMICA product uses IE's ActiveX Hypertext Markup Language (HTML) control to display lookup results. The customized browser window overlays any content that is displayed under the area encompassed by the customized browser window. Although the customized browser window can be moved about after it is opened on a display, there is no option that enables a user to selectively position the customized browser window to always appear at a specified position relative to a selected word, or at a desired fixed location on the display. The customized browser window includes a toolbar with standard navigation buttons, such as "back" and "forward" buttons. A menu also enables the user to set some limited options, as described herein. The toolbar also includes a data entry box that enables the user to enter a word or words on which a search for information should be done.

Below the toolbar, the customized browser window is divided into two frames, which the user cannot change. A primary frame displays the substantive search results (or error message, if no results were found). If a word is misspelled, the server will perform a spell check and send a list of alternatives for display in the primary frame. The listed suggestions are hyperlinks to substantive information from the ATOMICA database. If substantive information is provided, but the information is not of a desired type, the user may a select an option in a second frame of the customized browser window to view a list of links to possible alternative meanings. Similarly, one or more other options may be provided in the second frame that provide different types of information for the designated word(s). For example, a medical meaning may be available for the designated word(s) as an alternative to a business meaning that is displayed in the primary frame. The user may select yet another option in the second frame to perform a standard Web search for a list of hyperlinks on the Internet. The resulting hyperlinks are displayed in the primary frame.

To remove the customized browser window from display, the user may manually close the window, or click in another window. Manually closing the customized browser window causes the previously active window underlying the customized browser window to become active again (sometimes referred to as "shifting the focus" to the window). The ATOMICA software assumes that the window containing the designated word was the active window. Thus, the ATOMICA software shifts the focus to that window, even if another window was previously active before the word was designated in a different window. Consequently, the user must click the cursor in the previously active window to shift the focus back to that window. This characteristic of continually shifting the focus makes it difficult for a user to designate words in a secondary window and utilize the resulting substantive information for work in the previously active window. For example, a user may be editing a research report in an active window using a word processor and may wish to obtain substantive information about multiple words found in a secondary window that is displayed by a database program. Using the ATOMICA software, the user must continually shift the focus back and forth between the word processor window and the database window.

Closing the customized browser window optionally (by default) also causes the semi-persistent answer bar to appear on the user's display. As discussed above, the answer bar does not provide any substantive information, but instead, simply provides an input text box in which user can enter a word or words on which to conduct a search for information. The answer bar may be minimized to a small tab, but either the tab or the answer bar then remains on top of other displayed items, and obscures anything underneath it in the display.

A somewhat similar commercial product/service provided by Babylon.Com Ltd., called BABYLON™, combines the localized reference model with the help model and optionally utilizes network access and standard Web searching. When a user clicks on a text item with a mouse, the BABYLON program recognizes a word or words comprising the selection and searches local and/or online glossaries for information related to the selected word(s). If found, a small pop-up window includes a definition, a language translation, and/or other content drawn from glossaries selected by the user.

The BABYLON software must be downloaded and installed on the user's computer. Also as is true of the ATOMICA program, if the user is not aware of the existence of the BABYLON program, then the user will not know to download it from the source Web site. Because there is no apparent indication to a novice user that the software is available, the existence of the BABYLON software is thus also somewhat difficult to discover. In addition, as was true of the ATOMICA software, even if the BABYLON software is preinstalled for the user and set to automatically load upon startup of the user's computer, its use will not be readily apparent, since the user will not know how to designate a word to activate the software without receiving instruction, or learning from another person. Accordingly, the manner in which the BABYLON software is employed will also be somewhat difficult for a user to discover.

Like the ATOMICA software, the user presses one or more mouse buttons while holding down one or more keys on the user's keyboard to activate the software, but the BABYLON software default setting enables a user to press a single mouse button to activate the software. To avoid deactivating functions and quick menus that are already associated with the left and right mouse buttons, if one of these is selected to activate the search for information, the BABYLON software alternatively enables a user to select a word with a center mouse button, e.g., by pressing a scroll wheel if the user's mouse is so equipped. For a user having a mouse with a center button, it is a little easier to remember how to activate the program, if the center mouse button is chosen for this purpose. Nevertheless, the user must still perform some affirmative action to activate the software, and will lose any other functions normally associated with the center mouse button or wheel.

As indicated, the software recognizes a mouse click on a single word or on a set of words, such as "prime rate" or "mother-in-law." If the user clicks on a single word in a consecutive set of words (e.g. mother-in-law), the software will first resolve the single word by itself. If the user clicks on the same word again, the software generally resolves the set of words with the surrounding context words.

Whether the single selected word, or the set of words are resolved at all also depends on where the selected word falls in relation to certain punctuation marks. For example, in the above quoted phrases, the BABYLON program fails to recognize a word that is directly bounded by a quotation mark, such as the word "mother" in the quoted phrase of "mother-in-law." However, the BABYLON program recognizes the word "law" in the quoted phrase of "mother-inlaw," apparently because there is a comma or period before the closing quotation mark. A user may also manually enter single or multiple words in a search field of the pop-up window.

Determination of the word or words depends on the glossaries that are preselected by the user. Each glossary contains a collection of information on a related topic, such as a specific language, a field of science, a unique definition for a company, or other reference material. The glossaries may be downloaded and accessed at a client's local computer, may be accessed via a network or over the Internet, or may be accessed as a combination of local and online glossaries. The BABYLON program searches offline glossaries before searching online glossaries. Within that framework, the BABYLON program appears to determine results in the order of the preselected glossaries. The user may modify the order of the user's individual list of preselected glossaries by dragging and dropping a glossary name into the list.

If the selected word is not included in the glossaries that were preselected by the user, the BABYLON program will attempt to identify one or more non-selected glossaries that include the selected word, and enable the user to add those one or more non-selected glossaries to the user's list of glossaries. However, if the selected word is misspelled, or otherwise unrecognized, the BABYLON software will simply issue an error message in the pop-up window, without any further suggestion. Although not automatically suggested by the BABYLON program, the software enables the user to perform a Web search of the selected word(s) or refer to other online sources, such as an online encyclopedia. However, these additional searches are done and displayed through a separate browser window.

A result of a search by the BABYLON program that is returned from a glossary is displayed in a small pop-up window near the location of the selected word(s). The pop-up window overlays any display content disposed under the area of the pop-up window. The user may split the pop-up window into two sides with one side showing the results and the other side showing other preselected glossaries that include information on the selected word(s) and can select one of the other preselected glossaries in the other half of the window to see the information from that preselected glossary.

The pop-up window can be set to automatically close or minimize when the user moves the mouse again. However, even if the pop-up window automatically closes, the user must re-click in the text area to reactivate the window containing the text (bringing the text window back into focus). Once the pop-up window is closed, there is no other persistent supply of information that can be again accessed, without repeating the search for the information.

Although the products discussed above provide some substantive information in response to a user selecting text and activating a search, they share the following inadequacies. First, the products are difficult for a user to initially discover, and even if preinstalled, a user will not necessarily understand how to use the products. Secondly, they require a user to perform some affirmative action to designate a word, rather than providing a persistent flow of information. Third, the required affirmative action can be somewhat difficult for a user to remember. Fourth, the products employ a character recognition of the bitmap portion of the display screen selected by a user to identify a word or words. And fifth, when their display is active, they obscure underlying content.

A product from a Japanese company, Justsystem Corporation, called DR. MOUSE™, attempts to address the second and third of these inadequacies. Rather than requiring an affirmative action by the user to access information about a designated word or phrase, the DR. MOUSE program implements a hover method for designating a word. The user simply positions the cursor over a word, and the DR. MOUSE software provides a Japanese definition or an English/Japanese translation in a pop-up window. However, the DR. MOUSE program appears to combine the local reference model and the local help model. The only aspect of the Web search model appears to be that DR. MOUSE enables a user to invoke a browser to perform a Web search for links related to the designated word. Software is installed on the user's computer and all substantive definitions and translations are provided from the local software. There do not appear to be any other sources of offline or online substantive information available, such as an encyclopedia.

To determine the word over which the cursor is hovering, the DR. MOUSE program uses character recognition. Specifically, DR. MOUSE appears to use the OKREADER™ OCR engine from Sumitomo Electric Systems Co. As is well known in the art, OCR requires scanning a graphical representation and identifying text characters in the graphical representation. These steps require rather sophisticated recognition that takes time to process, especially if multiple fonts or multiple character sets are supported. Such character recognition is also less reliable than processing text characters directly. Character recognition also can have difficulty recognizing words or phrases that wrap to another line.

The DR. MOUSE program displays the definition or translation in the pop-up window near the designated word. As with the other products discussed above, the DR. MOUSE pop-up window obscures any information in the underlying window. When the user moves the mouse over a different word, the pop-up window appears in a new location near the different word. Thus, there is always a pop-up window obscuring some portion of the underlying content.

Although the DR. MOUSE software does not require a user to perform some affirmative action with mouse buttons or a keyboard to designate a word, and does not require the user to remember any keys that must be activated, the program provides only limited information and does not address the remaining inadequacies discussed above. In light of these shortcomings of the prior art programs, it would clearly be desirable to provide an electronic content search and delivery system that is at least easily discoverable by users; doesn't require any affirmative action by the user to designate a word or words in any active or inactive window and obtain substantive information from multiple offline and online sources in an order that can be prioritized by the user; is easy to remember how to use, or doesn't require remembering keys and buttons, being persistently available with continuously updating information; has faster and more reliable word recognition than can readily be achieved with character recognition-based systems; and doesn't obscure information underlying the dialog produced by the program or otherwise take the focus away from the active window in which the text was entered.

SUMMARY OF THE INVENTION

The present invention is directed to a method for electronic content search and delivery by causing a target process associated with a displayed window (whether in focus on not in focus) to re-render data to the window in an update region within which a cursor is detected. The invention then determines a primary word that occurs at the cursor location from the re-rendered data. With this primary word, the invention searches an electronic data store for substantive content related to the primary word and displays the substantive content in a semitransparent window that is persistently visible to the user, yet still enables content underlying the results to be visible.

Alternatively, the user may select a primary word under the cursor by clicking a button on a pointing device while holding down a predetermined key on a user input device, such as a keyboard. However, the cursor location and primary word are preferably automatically detected when the cursor hovers over one location for a user-selectable period of time. Further, the resulting search information is automatically displayed in the semitransparent window. Thus, the invention enables a user to discover that the service is available, without any affirmative action by the user. Also, the search result is displayed in a manner that does not obscure information in an underlying window, and does not take the focus away from a window within which the user is actively working. By intercepting re-rendered data, the invention further provides faster and more reliable word recognition than prior art character recognition-based systems.

The data are re-rendered in accord with machine instructions inserted into the memory space of the target process. The inserted instructions cause the user's processor to hook into an output module provided by the operating system, so that the invention can intercept output to the target window, regardless of whether the target window is currently active. The inserted instructions cause the processor to invalidate an update region around the cursor and force the output module to re-render the data to the update region. While the output module is re-rendering the data to the update region, the data are intercepted and copied.

After obtaining the data proximate to the cursor, a text character closest to the cursor location, and the corresponding primary word that includes that closest character are determined. By detecting termination points that separate words, the invention further determines nearby context words. The primary and context words are used to search a data store for substantive content most directly related to the primary and context words. Preferably, the data store is first searched for a combination of the primary and context words. If no results are found, alternate combinations of the primary and context words are used, until finally the data store is searched for only the primary word. If a result is still not found, an alternate word that is spelled similarly to the primary word is displayed.

One or more local or remote data stores may be searched. The user may also prioritize the data from the data stores, so that data most relevant to the user is displayed first in the semitransparent window. The user may selectively obtain additional data from the other data stores by selecting an appropriate control in the semitransparent window. Further, the additional data will be available through a set of source links in a Full view window, which is displayed if the user selects the additional data, or if the user selects the primary word with a user input key-pointer button combination. The user may also set options through the Full view window.

Another aspect of the invention is directed to a machine-readable medium having machine instructions that carry out the steps described above. A further aspect of the invention is directed to a system that search for electronic content based on text that is adjacent to a cursor location in a display. The system includes a pointing device that produces a signal for controlling the cursor location and a display device that displays the cursor location in a window. The system further comprises a processor in communication with the pointing device and display device, and with a memory for storing machine instructions that cause the processor to perform steps generally consistent with the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 12 illustrates a Full view window displaying a list of options that the user can set;

FIG. 13 illustrates a Full view window displaying alternative startup options from which the user can select;

DESCRIPTION OF THE PREFERRED EMBODIMENT

Exemplary Operating Environment

Figure 1:
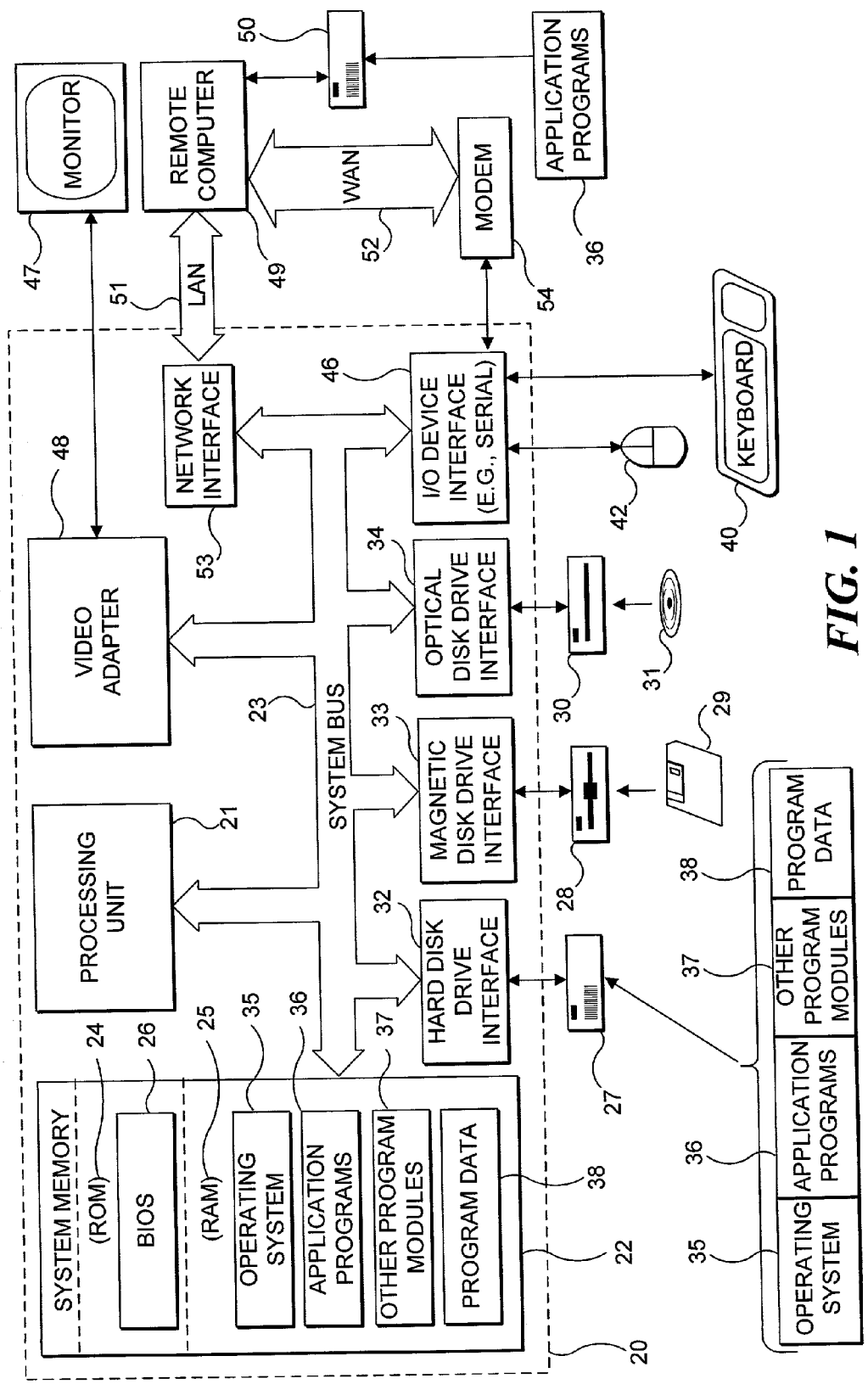
FIG. 1 is a block diagram of an exemplary system for implementing the present invention using a general purpose computing device in the form of a conventional personal computer (PC)

FIG. 1 and the following discussion are intended to provide a brief, general description of a suitable computing environment in which the present invention may be implemented. The invention may be practiced on a single computing device, but will generally be described in regard to a client computing device and a server or other remote computing device connected by a communication network, both of which will typically include the functional components shown in FIG. 1. Although not required, the present invention will be described in the general context of computer executable instructions, such as program modules that are executed by a PC. Generally, program modules include application programs, routines, objects, components, functions, data structures, etc. that perform particular tasks or implement particular abstract data types. Also, those skilled in the art will appreciate that this invention may be practiced with other computer system configurations, particularly in regard to a client device for executing personal productivity tools, including hand-held devices, pocket personal computing devices, digital cell phones adapted to execute application programs and to wirelessly connect to a network, other microprocessor-based or programmable consumer electronic devices, multiprocessor systems, network PCs, minicomputers, mainframe computers, and the like. As indicated, the present invention may also be practiced in distributed computing environments, where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, and/or other information. In addition to the monitor, PCs are often coupled to other peripheral output devices (not shown), such as speakers (through a sound card or other audio interface—not shown) and printers.

As indicated above, the invention may be practiced on a single machine, however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52, such as the Internet. Modem 54, which may be internal or external, is connected to the system bus 23 or coupled to the bus via I/O device interface 46; i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

EXEMPLARY EMBODIMENT

Figure 2:
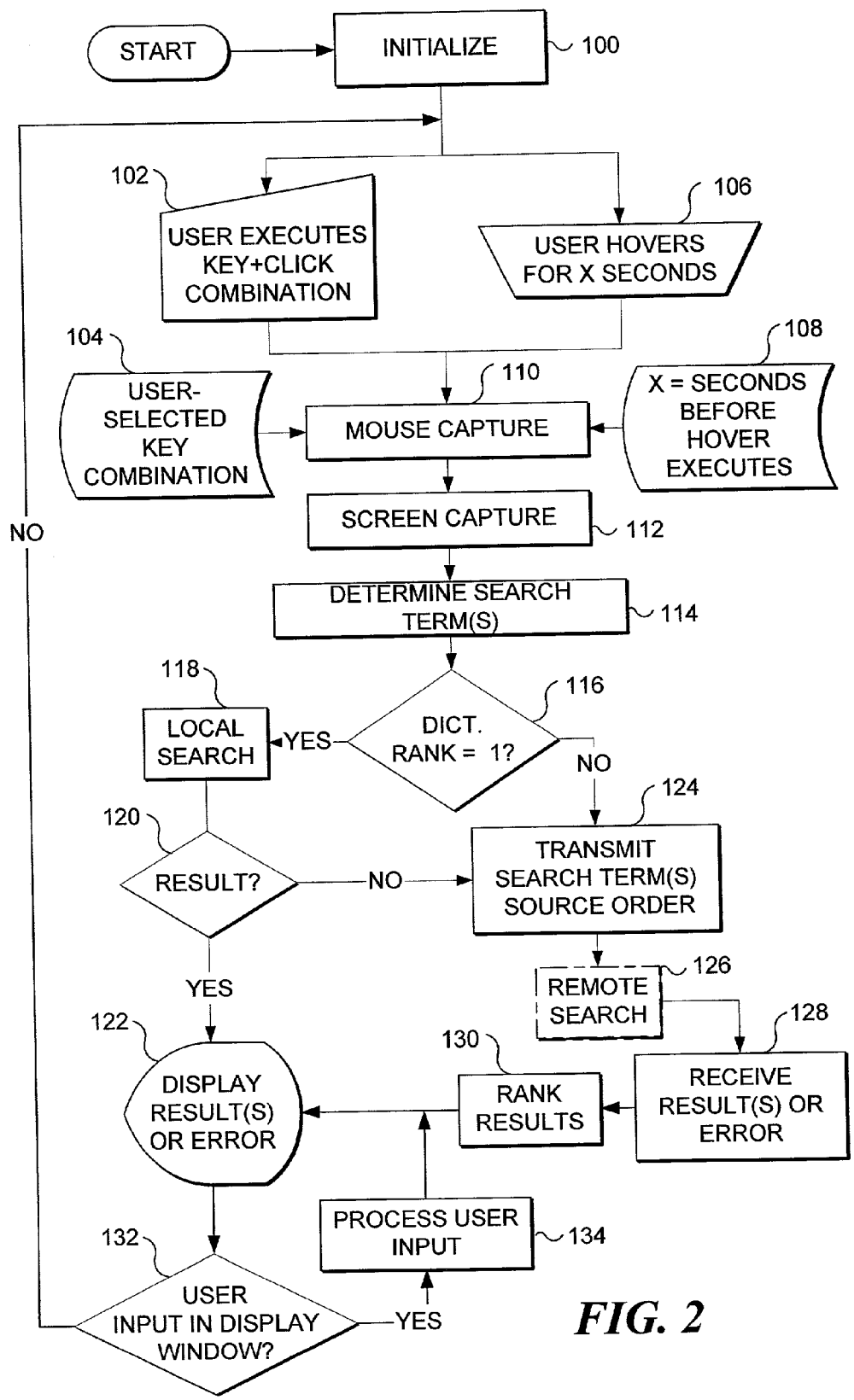
FIG. 2 is a flow diagram illustrating overall logic of a preferred embodiment.

FIG. 2 is a flow diagram illustrating overall logic of a preferred embodiment. This embodiment is implemented as a service called FACTFINDER™. An initialization step 100 includes a step of checking a network connection. If a network connection is available upon the user's logon in the operating system, a semitransparent Mini view window may be displayed if a startup option is preset to open the Mini view. Thus, the availability of the service is immediately evident, even if the user is unaware that the service exists. For example, if the service is pre-installed on the user's computer and automatically started, the user will readily discover that the service is provided. The user may instead set the service to startup in a Full view window, which is a more typical opaque window. Through the Full view window, the user can set other options, some of which are discussed below.

Initialization also includes checking whether an offline dictionary is present. Preferably, the offline dictionary is an abridged dictionary that stores definitions sufficiently concise to fit into the Mini view. If the dictionary is locally present, e.g., stored on the user's hard drive, many word searches can be done locally to reduce communication over the network. However, if the dictionary is not locally present, a remote dictionary will have to be used instead. Initialization may similarly include checking for other local resources.

Initialization further includes setting a global mouse hook into the operating system. A SetWindowsHookEx API can be used to gain access to messages being sent from a mouse to the operating system. Such access enables the service to monitor the mouse messages.

If the service was initiated manually by the user, the service displays a home page to the user with a list of options and information. The user can review the information, change optional settings, or manually enter a term to search on. If the service was initiated automatically when the operating system boots up, the service checks for a startup option that is discussed in more detail below, with regard to FIG. 13.

Once the service is initialized, the service waits for an event that triggers a search for substantive information. As indicated, the user may manually enter a search term through the home page. However, if the Mini view window is displayed or no window is displayed, the user may trigger a search, at a step 102, by clicking on a word while holding down a preselected key as defined by a user-selected key combination 104. Using such a key-click combination will open a Full view window, similar to that displaying the home page, and invoke a search related to the word indicated by the mouse click.

Alternatively, if the Mini view window is already displayed, the user may trigger a search, at a step 106, by simply keeping the mouse stationary over a word for a predetermined time 108. Keeping the mouse stationary over a word is referred to as hovering. The result of a search triggered by hovering will be displayed in the Mini view window. Hovering does not require the user to remember and perform an affirmative action (such as depressing one or more specific keyboard keys in conjunction with a pointing device button) to trigger a search and display a result. Thus, the service is easily discoverable, and no instruction is required to enable a user to use the service. Processing mouse hovers and key-click combinations is performed at a step 110, which is described in further detail below with regard to FIG. 3.

At a step 112 of FIG. 2, the service captures a word or words that are proximate to the display cursor controlled by the mouse or other pointing device. Unlike current products, the present invention does not require a character recognition engine to determine the word(s) indicated by the cursor. As described below with regard to FIG. 4, the present invention captures the text directly. Once the text is captured, the service determines one or more search words from the text, at a step 114 of FIG. 2.

At a decision step 116, the service determines whether a dictionary has been selectively ranked by the user as the first source of substantive information in which to search. Through the optional settings discussed above, the user may define the order or ranking of multiple sources in which the service will search. Since a dictionary is often a preferred source of information, the dictionary is set as the first source to search as a default. Preferably, an abridged dictionary is stored on the hard drive (or on optical memory medium) of a user's PC to eliminate the need for and possible delay associated with network communications. Thus, if the dictionary is still ranked as the first source, the service performs a local search of the abridged dictionary, at a step 118. Those skilled in the art will recognize that other sources may also be stored and searched on the user's local PC. If a search result is found in the abridged dictionary, at a decision step 120, the service displays the result at a step 122. As indicated above, whether the result is displayed in the Mini view window or the Full view window depends on the startup settings and how the user initiated the search.

If no search result was found in the abridged dictionary, or if the dictionary (or other locally stored reference source) is not ranked as the first resource in which to search, the service transmits the search word(s) over a network (such as a LAN, WAN, or the Internet) to a remote device, at a step 124, for searching a full dictionary and/or the other remotely stored sources. The service also transmits a prioritized order of the sources in which the user wishes the search to be done.

By knowing the order in which the source(s) are to be searched, the remote device can return substantive information that is most valuable to the individual user, in accord with the needs and desires of the user. Also, if the Mini view window is selectively displayed, only a relatively small amount of information needs to be displayed in the Mini view window. Thus, only the first search result may be transmitted back to the user's computer for display in the Mini view window, thereby minimizing network traffic.

A remote search is performed at a step 126, and the service receives the results of the search at a step 128. The results are then ranked and displayed at step 130. Both the Mini view window and the Full view window provide at least one link and a search box that enable the user to obtain additional information regarding the results or information about a different search term. Thus, at a decision step 132, the service determines whether the user selected a link or provided input to the search box. If the user does request additional information, the service obtains the information based on the user input, at a step 134. Any new information obtained that is based on the user input will be displayed in the Full view window. However, if the user does not request additional information, the service simply waits for the predetermined key-click combination or the predefined hover time to lapse if only the Mini view window is present.

Figure 3:
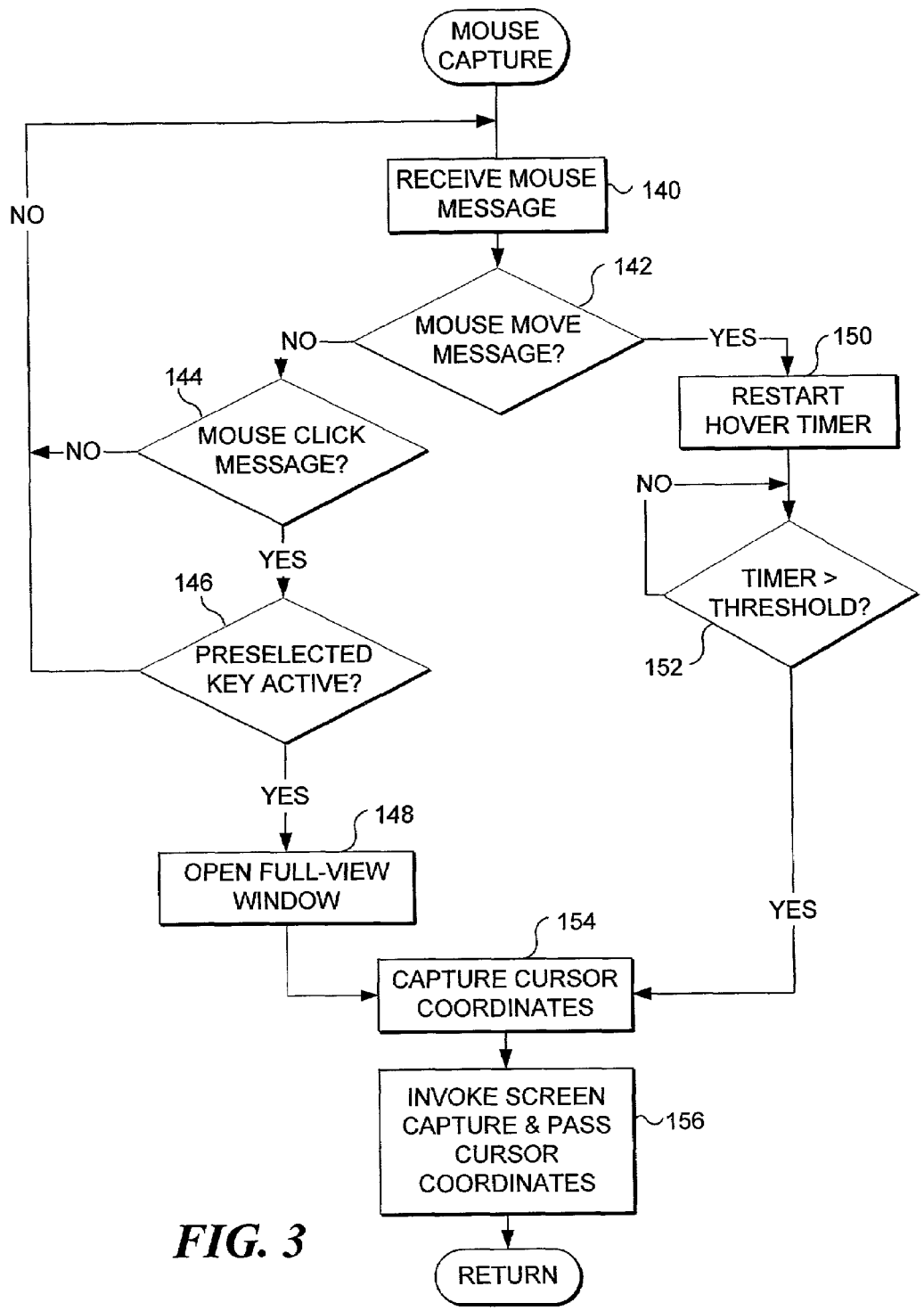
FIG. 3 is a flow diagram illustrating logic for performing a mouse capture.

FIG. 3 is a flow diagram illustrating logic for performing a mouse capture. At a step 140, the service receives a mouse message. Preferably, the service utilizes a hook procedure, such as WH_MOUSE of the WINDOWS™ operating system, to monitor mouse messages. At a decision step 142, the service determines whether the received mouse message was a "move" message, corresponding to movement of the mouse or other pointing device by the user. If the received message was not a move message, the service determines at a step 144, whether the received message was a "click" message, corresponding to the user actuating a button on the mouse or other pointing device. If the received message was not a click message, control returns to step 140 to await another mouse message. However, if the received message was a "click" message, the service determines, at a decision step 146, whether a preselected key was depressed at the same time that the "click" message was received. This key may be preselected by the user to indicate that the user wishes to obtain information about a word when the preselected key is held down while the mouse or other pointer device button is clicked. If the preselected key was not active (i.e., actuated), control returns to step 140 to await another mouse message. However, if the preselected key was active when the mouse button was clicked, the service opens a Full view window, at a step 148, to display information about the word(s) selected with the key-click combination.

As discussed above, an alternate method of selecting a word is to position the cursor so that it hovers over the word. If the service receives a mouse move message, the service starts a hover timer, at a step 150. If the service receives a subsequent mouse move message, the service restarts the hover time at step 150. At a decision step 152, the service determines whether a the hover time has exceeded a predefined threshold. The user may predefine the hover time threshold through an options page. If the hover time threshold has not been exceeded, and the service has not received a new mouse message, the hover timer simply iterates in a timing loop.

If the mouse remains stationary (within a predefined tolerance), so that the hover time exceeds the predefined threshold, or if the key-click combination is activated, the service captures the cursor coordinates, at a step 154. The coordinates are preferably obtained from a mouse data structure (e.g., MOUSEHOOKSTRUCT) by calling a mouse hook dynamic link library (DLL). At a step 156, the service invokes a screen capture module, as described below, and passes the cursor coordinates to the screen capture module.

Figure 4:
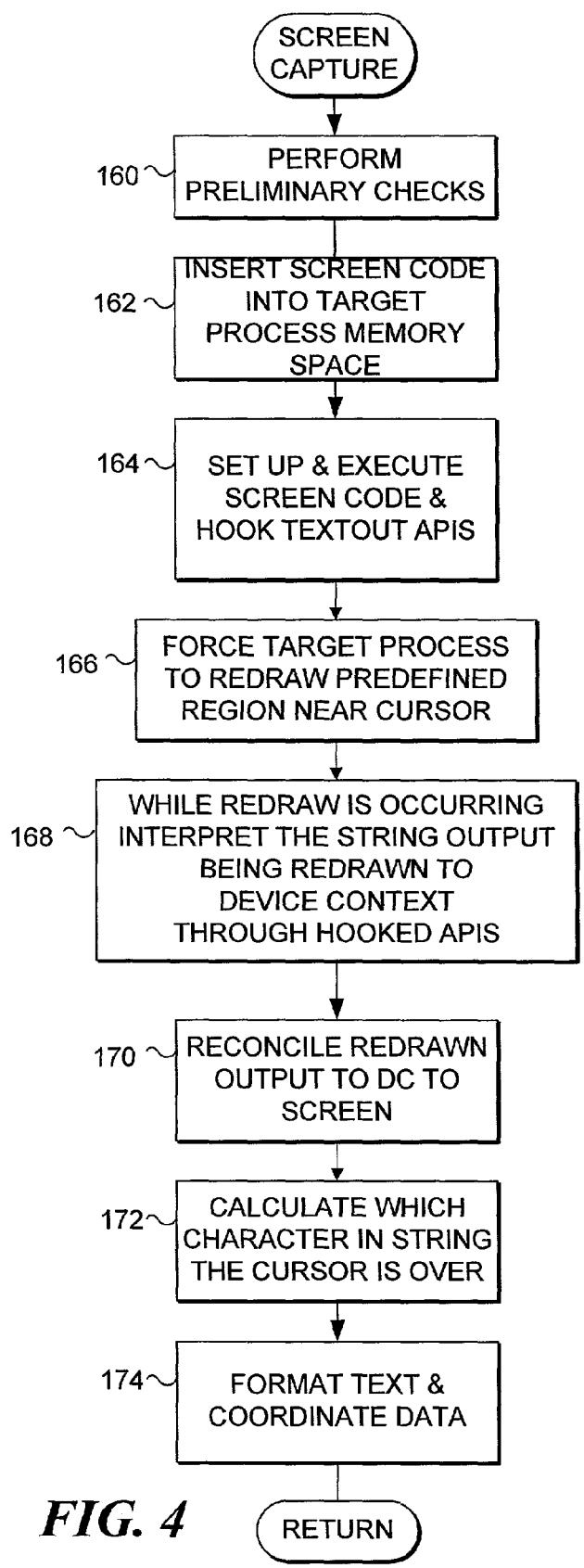
FIG. 4 is a flow diagram illustrating general logic for performing a screen capture of text.

FIG. 4 is a flow diagram illustrating general logic for performing a screen capture of text. Further detail is provided in FIGS. 5, 6 and 7. At a step 160 of FIG. 4, the screen capture module performs some preliminary checks to verify that a valid screen capture of the indicated word(s) can occur. Further details of these preliminary checks are provided below with regard to FIG. 5. At a step 162 of FIG. 4, the screen capture module inserts the screen capture code into a target process's memory space. The target process is the program that controls the window in which the selected word is displayed and is sometimes referred to as the target application. Those skilled in the art will recognize that the screen capture code is not necessarily physically inserted into the target process's memory space. Preferably, an .idata section of memory is patched with a pointer to the screen capture code. This patching step is preferably performed with a DLL injection through hooking of the module by the operating system. After execution, the screen capture code will point back to an address in the target process's memory space to continue execution of the target process, thereby maintaining the focus on the target process in the display.

Once the screen capture code is inserted, the screen capture module causes the inserted screen capture code to execute, at a step 164. Part of the execution includes hooking APIs, such as a text output API (TEXTOUT) and a bit block transfer API (BITBLT), that provide output to a device context (DC) of the target window. At a step 166, the inserted screen capture code forces the target process to redraw a predefined region of the window near the cursor. While the redraw is occurring, the inserted screen capture code interprets the output from the hooked APIs to the device context, at a step 168. At a step 170, the inserted screen capture code reconciles the output that was redrawn to the device context over to screen coordinates. Reconciliation includes such tasks as converting device coordinates to logical coordinates, compensating for zoom factors, compensating for font context, etc. At a step 172, the inserted screen capture code compares the screen coordinates of the redrawn output to the cursor location to determine the character to which the cursor is closest. Preferably, a font context API is utilized to determine an offset from the left side of the window to determine the character closest to the cursor. Depending on the target application, additional text reordering and coordinate data formatting is performed, if necessary, at a step 174.

Figure 5:
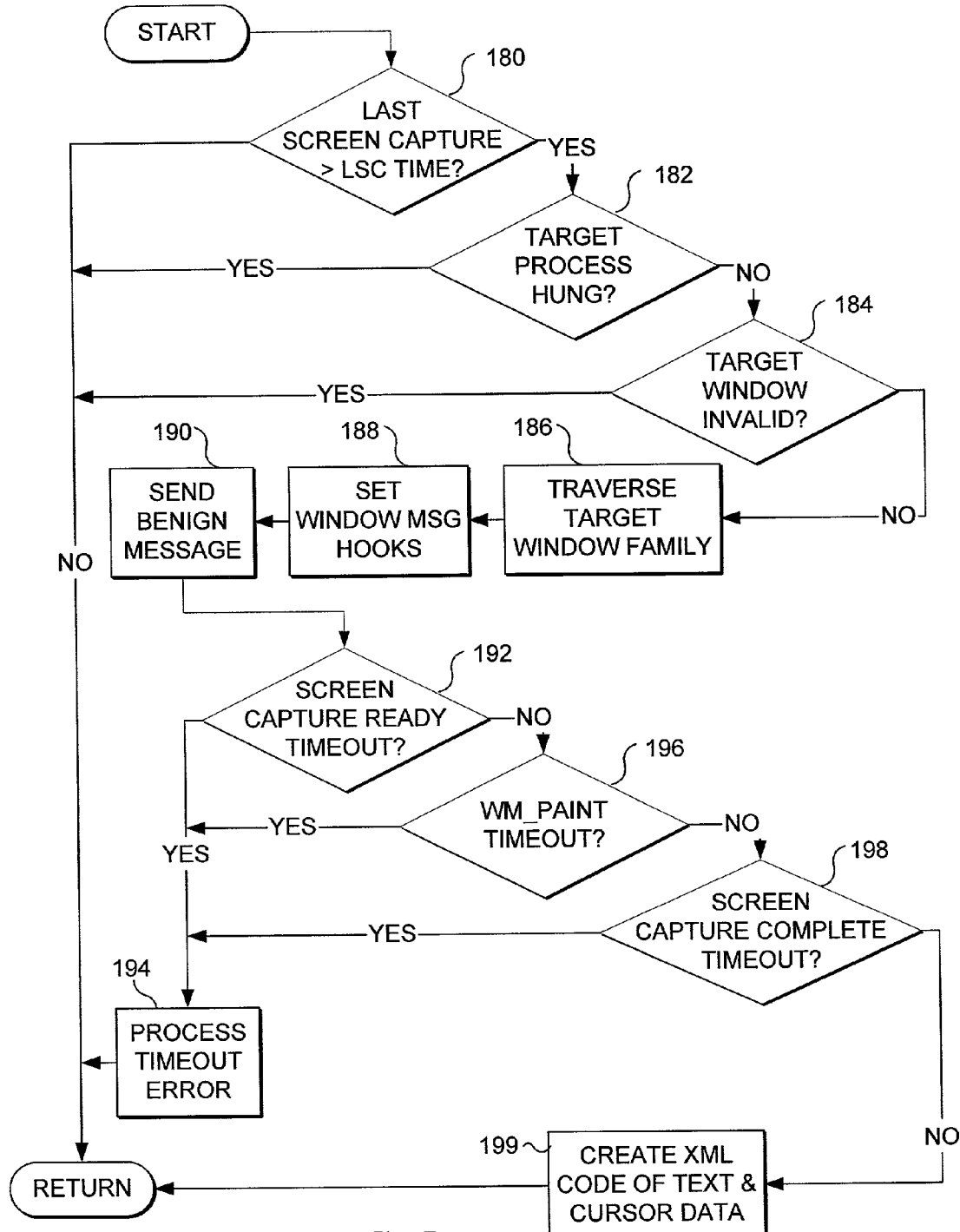
FIG. 5 is a flow diagram illustrating further detailed logic for performing a screen capture of text.

FIG. 5 is a flow diagram illustrating further detailed logic for performing a screen capture of text. This logic is preferably performed by the screen capture module of the service in coordination with the inserted screen capture code. As a preliminary check, the screen capture module determines, at a decision step 180, whether sufficient time has elapsed between the last screen capture and the current screen capture (e.g., a predetermined minimum interval sometimes referred to as Last Screen Capture (LSC) time). This preliminary check prevents unnecessary screen capture operations that might result from repetitive key-clicking, which is similar to key debouncing. If insufficient time has elapsed since the last screen capture, the current screen capture is aborted to await a new capture of text under the cursor. However, if sufficient time has elapsed since the last screen capture, the screen capture module determines, at a decision step 182, whether the target process is "hung." To make this determination, the screen capture module preferably utilizes a SendMessageTimeout API. If the target process is hung, the screen capture is aborted. If, however, the target process is not hung, the screen capture module determines, at a decision step 184, whether the target window is one of several types of windows considered to be invalid. For example, a menu bar is considered an invalid window type from which text will not be captured. If the target window is invalid, the screen capture is aborted. However, if the target window is valid, the screen capture module traverses the target window's children, siblings, and parents, at a step 186, and switches to the window of the family that is showing the text under the cursor, if the information under the cursor is not displayed in the top window of the family.

Once the above preliminary checks are complete, the screen capture module sets a number of window message hooks, at a step 188, preferably via a SetWindowsHookEx API. Preferably, the screen capture module first sets a WH_MOUSE hook, which is a system-wide hook for mouse messages. The screen capture module then preferably sets a WH_GETMESSAGE hook and a WH_CALLWNDPROCRET hook, which are hooks specific to the thread running the target window.

To insert the screen capture code into the target process's memory space, the screen capture module sends a benign message to the target process, at a step 190. For example, a WM_NULL message is sent to the target process. The benign message is intercepted by the WH_GETMESSAGE hook, which causes the operating system to load and execute a hook DLL containing the screen capture code in the target process's memory space. Typically, all processes are protected from each other. However, the hooking mechanism allows the service to run its code in the target process based on messages received by the target process.

As the inserted screen capture code begins to execute, the screen capture module monitors the progress. At a decision step 192, the screen capture module runs a timer that waits for a screen capture ready event to be set by the inserted screen capture code. If the screen capture ready timer times out before the screen capture ready event is set by the inserted screen capture code, the screen capture module processes a timeout error at a step 194, and aborts the screen capture. If the inserted screen capture code sets the screen capture ready event before the timeout period, the screen capture module runs another timer that waits for a WM_PAINT event to be set by the inserted screen capture code, at a decision step 196. The WM_PAINT event indicates that the inserted screen capture code caused a WM_PAINT message to be sent, which forces the target process to redraw the predefined region near the cursor. If the WM_PAINT timer times out before the WM_PAINT event is set by the inserted screen capture code, the screen capture module processes a timeout error at step 194, and aborts the screen capture. Conversely, if the inserted screen capture code successfully sets the WM_PAINT event, the screen capture module runs a third timer that waits for completion of the inserted screen capture code, at a decision step 198. If the completion timer times out before a screen capture complete event is set by the inserted screen capture code, the screen capture module processes a timeout error at step 194 and aborts the screen capture. However, if the inserted screen capture code successfully completes the screen capture and sets the screen capture complete event, in this embodiment, the screen capture module creates extensible markup language (XML) code of the captured text and cursor data, at a step 199. The inserted screen capture code returns the XML code to the service to determine the search terms.

Figure 6:
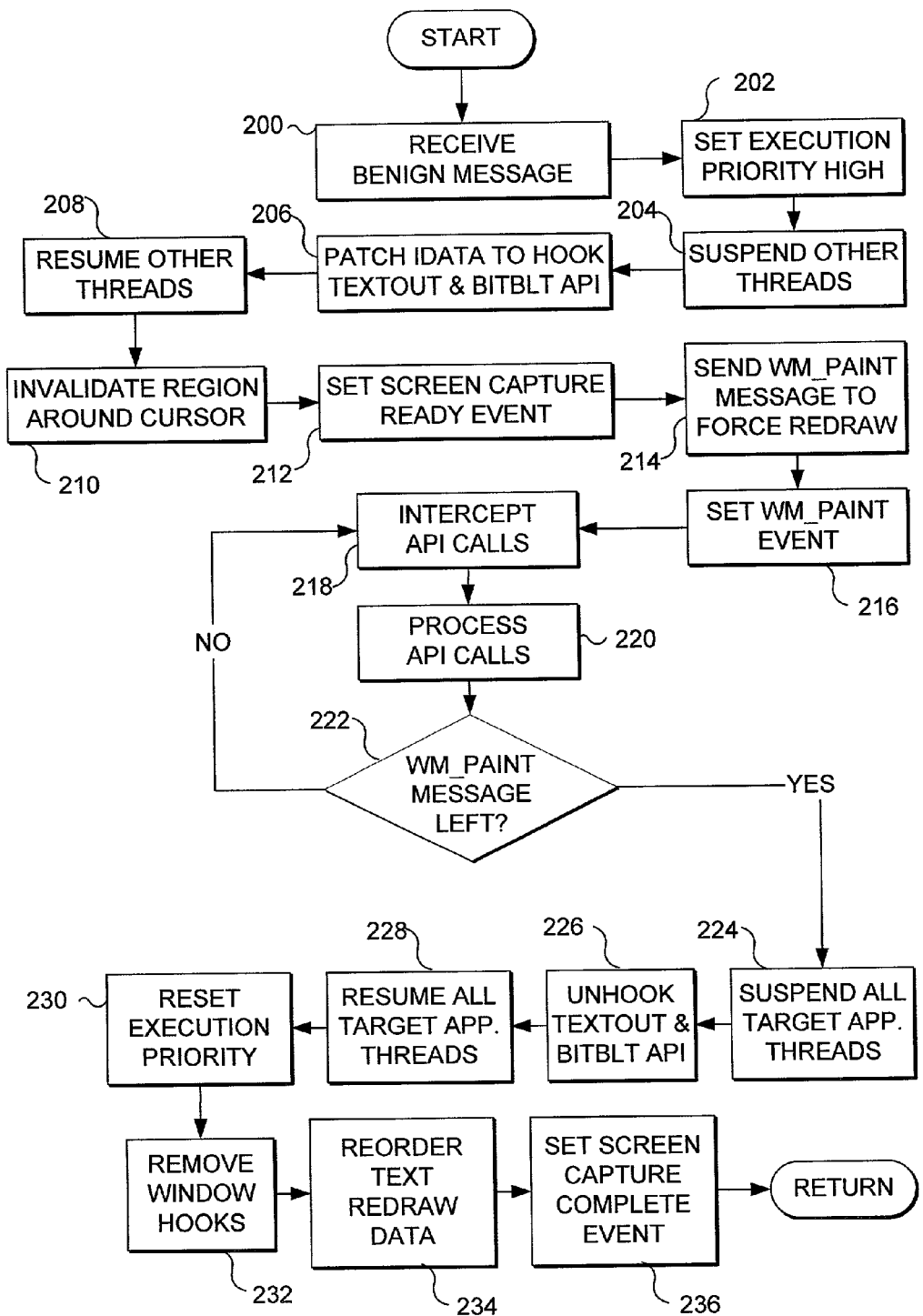
FIG. 6 is a flow diagram illustrating further detailed logic for performing a screen capture by code inserted into the target process's memory space.

FIG. 6 is a flow diagram illustrating further detailed logic performed by code that is inserted into the target process's memory space for capturing text data. At a step 200, the window message hook receives the benign message from the screen capture module. The benign message causes the operating system to load and execute the hook DLL, including the inserted screen capture code. To ensure that the screen capture will be executed as quickly as possible, the inserted screen capture code sets the execution priority to high, at a step 202. At a step 204, the inserted screen capture code then suspends all other threads in the target process, so that the other threads will not interfere with subsequent API hooking. To hook the TEXTOUT and BITBLT APIs, the inserted screen capture code patches the .idata section of the target process, at a step 206, so that calls to these APIs are pointed to the inserted screen capture code. Once the APIs are hooked, the inserted screen capture code resumes all other threads of the target process, at a step 208.

In order to force the target process to redraw the region near the cursor, the inserted screen capture code first invalidates the region near the cursor, at a step 210. Preferably, the inserted screen capture code includes a call to a graphics device interface (GDI) function, such as InvalidateRgn, to invalidate the region near the cursor. The region is preferably defined as an area approximately fifty pixels above the cursor location, approximately fifty pixels below the cursor location, and spanning the width of the target window client area. Invalidating the region near the cursor completes the setup tasks for the inserted screen capture code. Thus, once the region is invalidated, the inserted screen capture code sets the screen capture ready event, at a step 212, to notify the screen capture module of the progress.

Because a multitasking operating system can support multiple processes at the same time, the operating system manages the updating of the actual screen display that is shared by the multiple processes. Since the operating system is managing multiple processes at once, invalidating a region of one target window does not mean that the operating system will immediately update the invalidated region of that target window. Instead, invalidating a region of a target window only sets an update region that corresponds to the invalidated region. The operating system normally causes the update region to be redrawn when the operating system is not busy handling other tasks. To cause the update region to be redrawn, the operating system sends the WM_PAINT message to a window procedure of the target window. However, many updates to the screen may be needed from multiple processes, or from multiple activities within the same window. Rather than try to update the display after each activity, the operating system queues requests to update the display. Compared to some tasks, updating the screen is not the operating system's highest priority. Thus, the operating system normally sends the WM_PAINT message only if there are no other messages remaining in the message queue of the target process. However, to improve response time for getting substantive information to the user, it is preferable to force the operating system to immediately redraw the update region (corresponding to the invalidated region near the cursor). To force the operating system to immediately redraw the update region, the inserted screen capture code preferably utilizes a SendMessage API to directly send the WM_PAINT message, at a step 214. Those skilled in the art will recognize that the inserted screen capture code could force the operating system to send the WM_PAINT message by calling another GDI function, such as a RedrawWindow function. Once the WM_PAINT message is forced, the inserted screen capture code sets the WM_PAINT event, at a step 216, to notify the screen capture module of successful progress.

The window procedure of the target process will then begin to redraw the update region, and the inserted screen capture code begins to intercept certain API calls, at a step 218. For each intercepted API call, the inserted screen capture code process the API call, at a step 220. Further detail of this processing is provided below with regard to FIG. 7. At a decision step 222 of FIG. 6, the inserted screen capture code determines whether redraw is complete, by determining whether the WM_PAINT message has left the window procedure (e.g., whether the window procedure returned execution control back to the operating system. If the WM_PAINT message has not left the windows procedure, control returns to step 218 to intercept another API call.

Once the redraw is complete and the WM_PAINT message has left the window procedure, the inserted screen capture code performs the following cleanup steps and prepares the captured text data for further evaluation. At a step 224, the inserted screen capture code suspends all threads of the target process, so that the threads will not interfere with subsequent unhooking of certain APIs. Specifically, the text output API (TEXTOUT) and the bit block transfer API (BITBLT) are unhooked by the inserted screen capture code, at a step 226. At a step 228, the inserted screen capture code resumes all threads of the target process. Similarly, during its execution, the inserted screen capture code sets the execution priority to high, so that screen capture will occur quickly. The inserted screen capture code resets the execution priority, at a step 230. The inserted screen capture code then removes any remaining window hooks, at a step 232.

At a step 234, the inserted screen capture code retrieves data from the forced redraw of the predefined region near the cursor, and reorders the data if necessary. For example, some target applications may write out text to the window in an order different than left-to-right. To ensure further processing is done properly, the text data are reordered into a left-to-right format, preferably by either an API call sequence or by screen coordinates. When the data are properly formatted, the inserted screen capture code sets an event, at a step 236, indicating that screen capture is complete.

Figure 7:
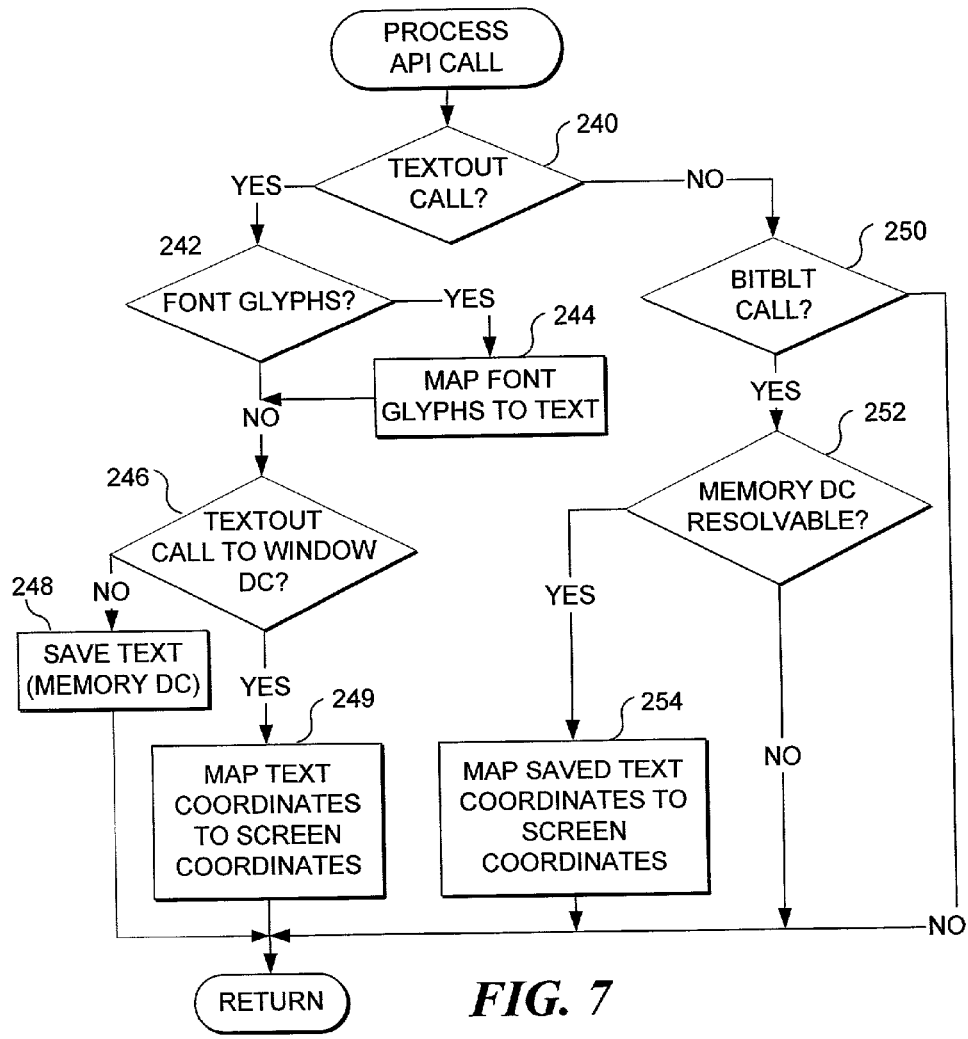
FIG. 7 is a flow diagram illustrating further detailed logic performed by the code that is inserted into the target process's memory space for processing intercepted API calls during forced redraw.

FIG. 7 is a flow diagram illustrating further detailed logic performed by the code that is inserted into the target process's memory space for processing intercepted API calls during forced redraw. At a decision step 240, the inserted screen capture code determines whether an intercepted API call is a TEXTOUT call. If the intercepted API call is a TEXTOUT call, the inserted screen capture code then determines, at a decision step 242, whether the TEXTOUT API was called with font glyphs rather than strings. If the TEXTOUT API was called with font glyphs, the inserted screen capture code creates mapping from characters to font glyph on the fly and maps fly glyphs to string characters, at a step 244. Specifically, the inserted screen capture code tests the font glyph for an "A" character and a "Z" character. The inserted screen capture code then constructs a table that maps the font glyph to Unicode to identify the characters.

Once the font glyphs are mapped, or if the TEXTOUT API was not called with font glyphs, the inserted screen capture code determines, at a decision step 246, whether the TEXTOUT API was called with window device context (DC). If the TEXTOUT API was not called with window device context, the TEXTOUT API was instead called with memory device context. In that case, the inserted screen capture code saves the data parameter of the API call, at a step 248, until a BITBLT API is called. However, if the TEXTOUT API was called with a window device context, the inserted screen capture code maps the coordinates of the text to the screen coordinates, at a step 249.

On the other hand, if the inserted screen capture code determines that an intercepted API call was not a TEXTOUT call, the inserted screen capture code determines whether the intercepted API call is a BITBLT API call, at a decision step 250. If the intercepted API call was not a BITBLT call, control returns to intercept another API call. However, if the intercepted API call was a BITBLT call, the inserted screen capture code determines, at a decision step 252, whether the previously saved TEXTOUT APIs were called with a memory device context that is resolvable with the parameters of the BITBLT call. If the APIs were not called with a resolvable memory device context, control again returns to intercept another API call. Otherwise, the inserted screen capture code maps the saved text coordinates to screen coordinates at a step 254. Control again returns to intercept another API call.

Figure 8:
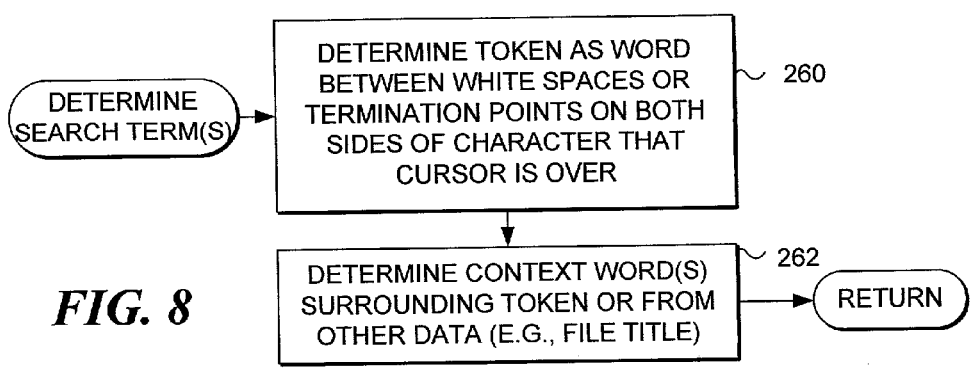
FIG. 8 is a flow diagram illustrating logic for determining one or more search terms from the captured text.

FIG. 8 is a flow diagram illustrating logic for determining one or more search terms from the captured text. At a step 260, the service determines a (primary) token. The primary token is the word directly under the cursor. To determine the token, the service finds a set of characters that are closest to the cursor location and that are between two white spaces or other termination points. TABLE 1 illustrates how various characters determine the token.

TABLE 1

| Character Evaluation Rules | |
| --- | --- |
| Character Type | Characters (Not Alphanumeric or White Space) |
| Termination Point | !¡""( )/\:;{} <=>?¿[]'"–©®™<br>Shift-ENTER character<br>ENTER character<br>Bullet character |
| Termination Point (when immediately followed by a character of white space) | . , '' |
| Remove | #* +~ |
| Treat like a space | |
| | Bang character |
| Treat like a space, additionally continue looking in this direction if the other direction does not contain a character of this type. | – |
| Keep | $ % & @ ^ '<br>Any other characters |
| Keep (when not immediately followed by a character of white space) | . , '' |

The character evaluation rules are also applied, at a step 262, to determined one or more context words that surround the token. Preferably, two context words are determined according to termination point rules, samples of which are illustrated in TABLE 2. In addition, or alternatively, context words may be taken from other data, such as a title of a file being displayed in the target window.

TABLE 2

Example Effects of Termination Point Rules

| Source Text (Token Is In Bold Font) | Token and Context Word(s) to Use |
|---|---|
| I like apples, dogs, and pickles. | dogs |
| I like apples, dogs, and pickles. | I like apples |
| I like apples, dogs, and pickles: I hate cats. | hate and pickles |
| I like apples, dogs, and pickles. | I like apples |
| I like apples, dogs, and pickles: I hate cats. | I hate cats |

Figure 9:
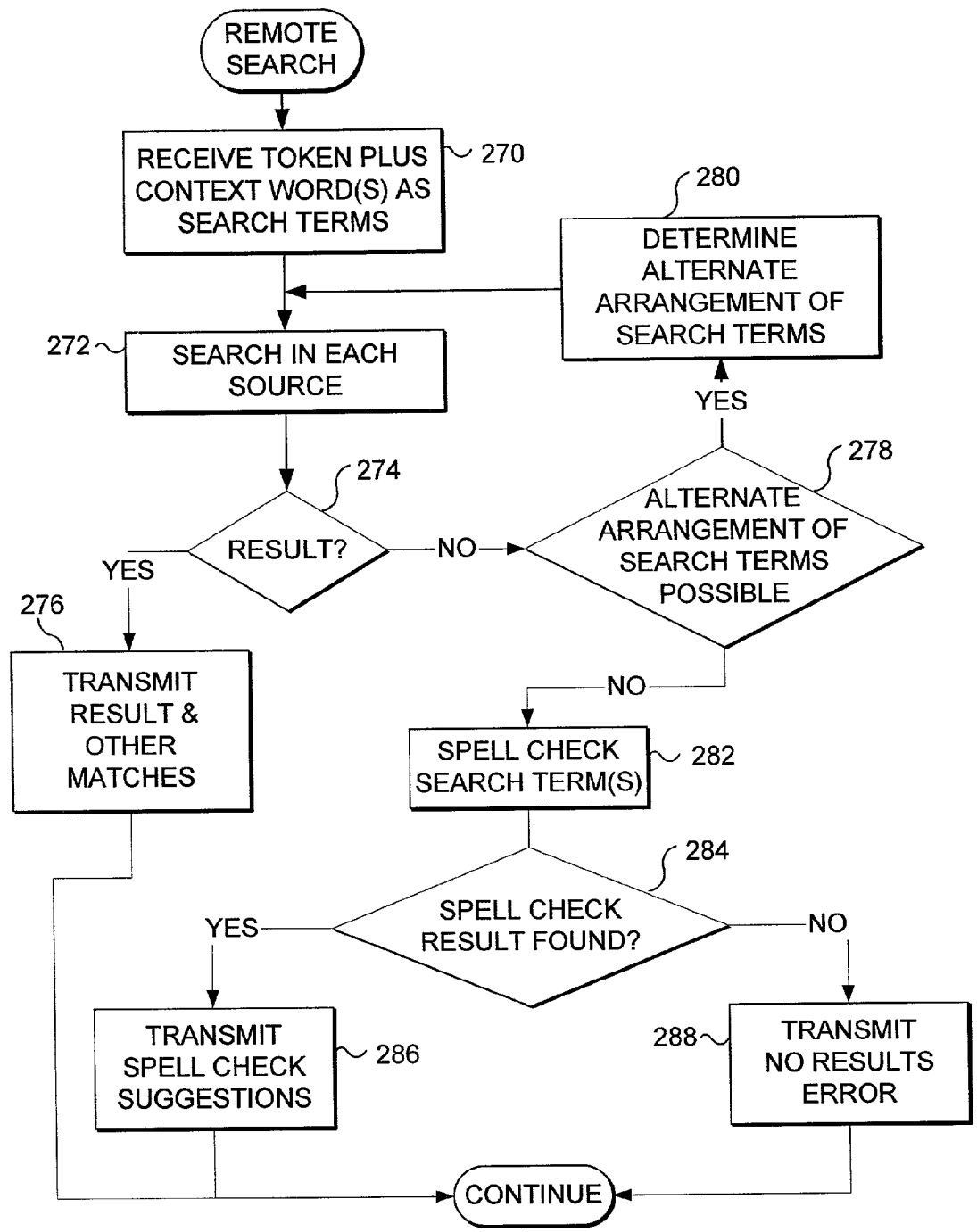
FIG. 9 is a flow diagram illustrating logic for performing a search based on the token and context words.

FIG. 9 is a flow diagram illustrating logic for performing a search based on the token and context words. For discussion purposes, FIG. 9 illustrates search logic utilized by the remote device to search multiple sources. However, those of ordinary skill in the art will recognize that the same, or very similar logic, can be used by the user's local PC. At a step 270, the searching system receives the token and any context word(s). When multiple sources are available, the searching system also receives the ordering of sources preferred by the user. The searching system may also receive an indication of whether any result is to be displayed in the Mini view window or the Full view window. At a step 272, the searching system searches the sources in the order specified by the user for the token along with the context words. If a matching result is found, at a decision step 274, the searching system may transmit only the first result, if the result is to be displayed in the Mini view window, as indicated at a step 276. As noted above, since the Mini view window can only display a limited amount of information, it is more efficient to transmit only the first result. However, if the result is to be displayed in the Full view window, multiple matching results can be transmitted, at step 276.

If no matching result is found based on the first combination of the token and context words, the search system determines, at a decision step 278, whether an alternate arrangement of the token and context words is possible. If a context word can be eliminated, or exchanged for another context word, the search system determines an alternate arrangement of the token and context words, at a step 280. TABLE 3 illustrates rules for determining alternate arrangements.

TABLE 3

Example Alternate Arrangements

| Token Order (Primary in Bold Font) | Searches To Try (In Order) |
|---|---|
| Apple Dog Cat | Apple Dog Cat<br>Apple Dog<br>Apple |
| Apple Dog Cat | Apple Dog Cat<br>Dog Cat<br>Apple Dog<br>Dog |
| Apple Dog Cat | Apple Dog Cat<br>Dog Cat<br>Cat |
| Apple Dog | Apple Dog<br>Apple |
| Apple Dog | Apple Dog<br>Dog |
| Apple | Apple |

If no further alternate arrangements are possible and no matching result was found, the search system performs a spell check on at least the token word, at a step 282. If a spell check result is found, at a decision step 284, the search system may transmit an alternate spelling suggestion, at a step 286. However, if a spell check result is not found, the search system transmits an error indicator for display to the user, at a step 288.

Figure 10:
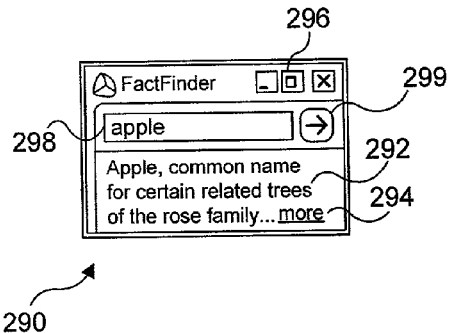
FIG. 10 illustrates a Mini view window in a preferred actual size.

FIG. 10 illustrates a Mini view window 290 in a preferred size. As indicated above, Mini view window 290 provides information related to words over which the cursor hovers. Like most windows in a graphical user interface operating system, Mini view window 290 can be moved to any desired location on the user's display screen, such as a lower corner. Due to its size and the ability to set Mini view window 290 to a semitransparent mode, the Mini view window is not obtrusive, yet persistently provides substantive information. Via Mini view window 290, information relevant to the user is automatically accessed and made readily available to the user, without requiring any affirmative action by the user.

Mini view window 290 includes an information display area 292, which preferably displays approximately fifty (50) characters of information. Notably, the display of Mini view window 290 and its active update as the cursor is moved to hover over other text, does not require focus to be taken away from the active window (i.e., the window currently with focus). Focus is not transferred to Mini view window 290, and is not transferred to the current target window over which the cursor is hovering. Substantive information appears in display area 292 for the one or more words that are currently selected in the target window with the cursor. Mini view window 290 does not require focus, because the Mini view window is set to only display information and does not expect any user input. Of course, Mini view window 290 will accept user input, and thereby take focus, if the user clicks in the Mini view window.

If the user desires additional information regarding the current selected term(s), the user may select a "more" link 294. Selecting more link 294 causes Mini view window 290 to close and a Full view window to be displayed. Selecting more link 294 also causes another search to be performed. As discussed above, only the first found result is preferably transmitted, or otherwise provided, to Mini view window 290, to reduce communication traffic. However, if the user desires additional information, a subsequent search is performed to make search results from all sources available to the Full view window. As an alternative to more link 294, the user may select a maximize button 296 to display the Full view window. Again, another search is performed to make search results from all sources available to the Full view window.

If the user desires information about a different search term, the user may enter the different search term into an input box 298 and press a search button 299. Entering a different search term also causes a Full view window to be displayed.

Figure 11:
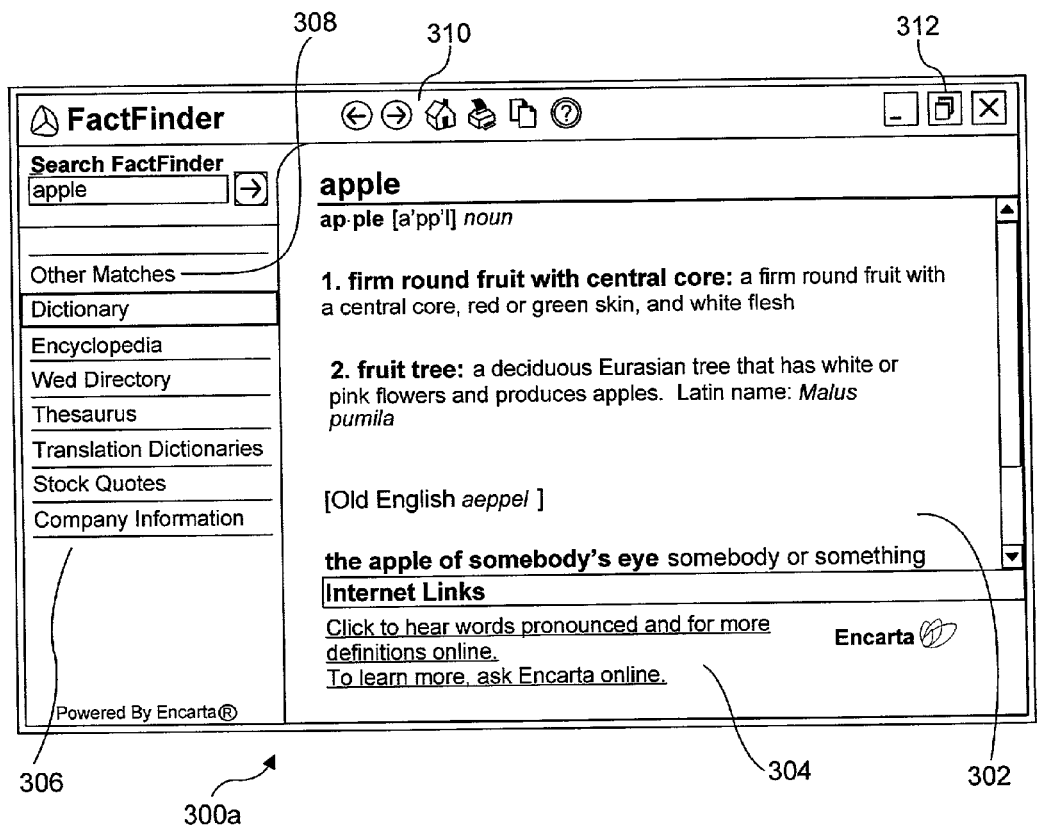
FIG. 11 illustrates a Full view window in a preferred actual size.

FIG. 11 illustrates a Full view window 300a in a preferred size. Full view window 300a provides a scrollable display area 302. Links to word pronunciation and additional information are provided in a links display area 304. Further information can be obtained through links in a sources area 306. Sources area 306 lists the available sources in the order defined by the user through selections made in the optional settings. The user may select any source in the list and information about the current search term will be displayed in scrollable display area 302. The user may also select an "other matches" link 308 that provides a list of alternative search terms that are similar to the current search term.

Full view window 300a also includes a number of function buttons 310 for navigating between display pages, returning to a home page, printing the current information, copying the current information, obtaining help information, and other typical functions. The user can return to the Mini view window by selecting a minimize button 312.

FIG. 12 illustrates a Full view window 300b displaying a list of options that the user can selectively set. For example, FIG. 13 illustrates a Full view window 300c displaying alternative startup options that can be set by the user. Included is a Mini view startup option 314, whereby the Mini view window is opened upon connection to the network. Mini view startup option 314 may be selected during installation by a computer supplier, so that the service is immediately discoverable by a novice user. Those skilled in the art will recognize that other criteria may be used to automatically startup the Mini view window, such as when the PC is turned on (booted up), thereby making the service immediately discoverable. The user may apply a change to an option by selecting an apply link 316.

Figure 14:
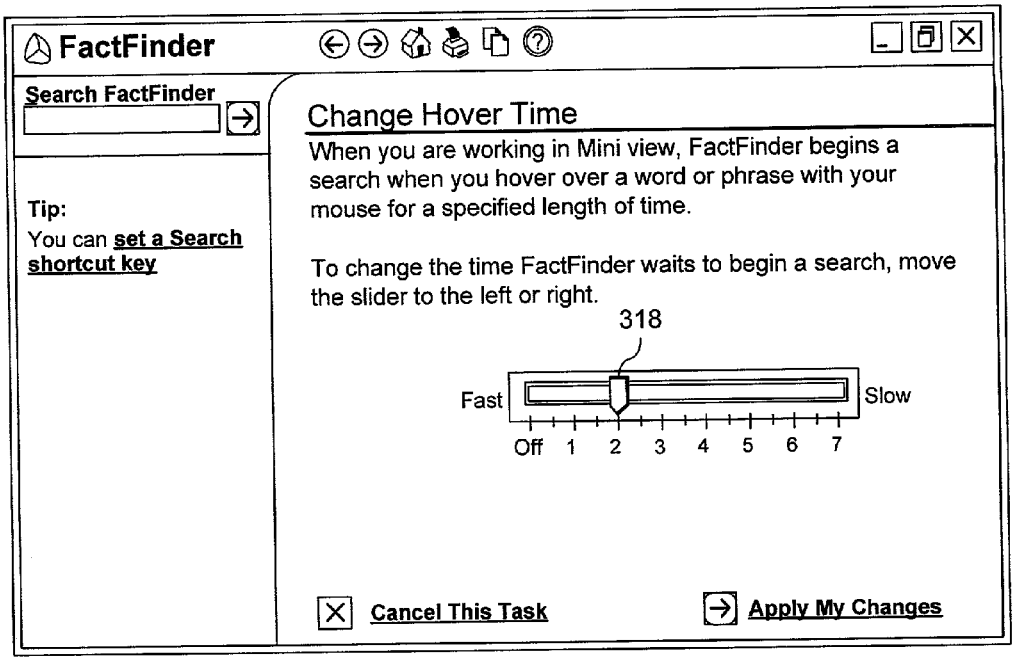
FIG. 14 illustrates a Full view window displaying an option to change the hover time before executing a search.
Figure 15:
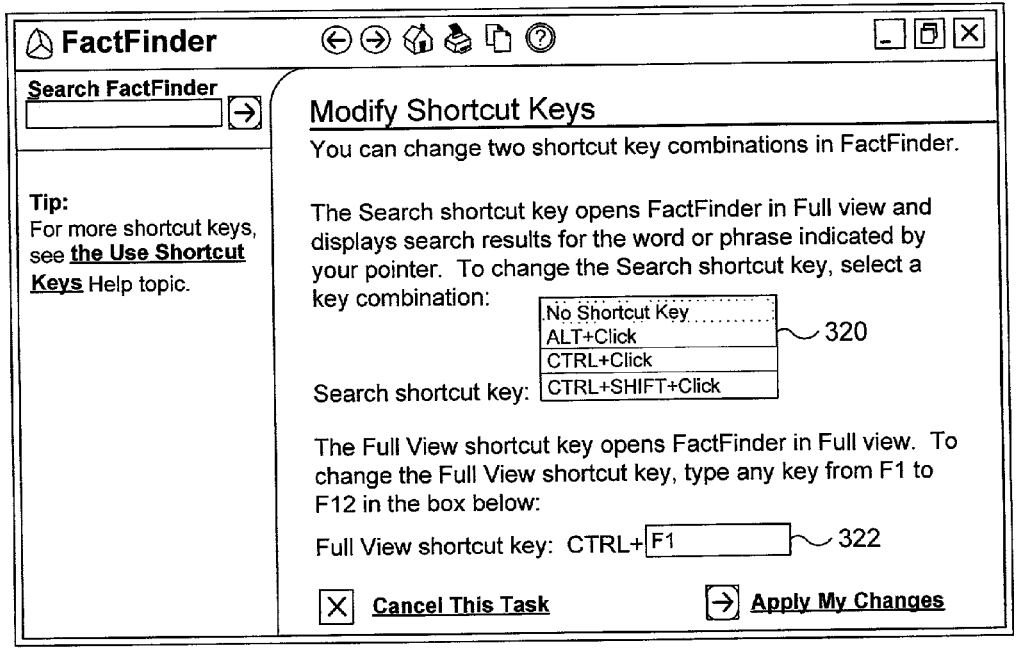
FIG. 15 illustrates a Full view window displaying an option to select a shortcut key combination.

FIG. 14 illustrates a Full view window 300d displaying an option to change the hover time before executing a search. The user may move a slider 318 to select the number of seconds that the service waits for the cursor to hover over a word before beginning a search of that word and related context words. Alternatively, FIG. 15 illustrates a Full view window 300e displaying an option to select a shortcut key combination. The user may optionally select a key-click combination 320 or a universal access key—key combination 322, to initiate a search on a word.

Figure 16:
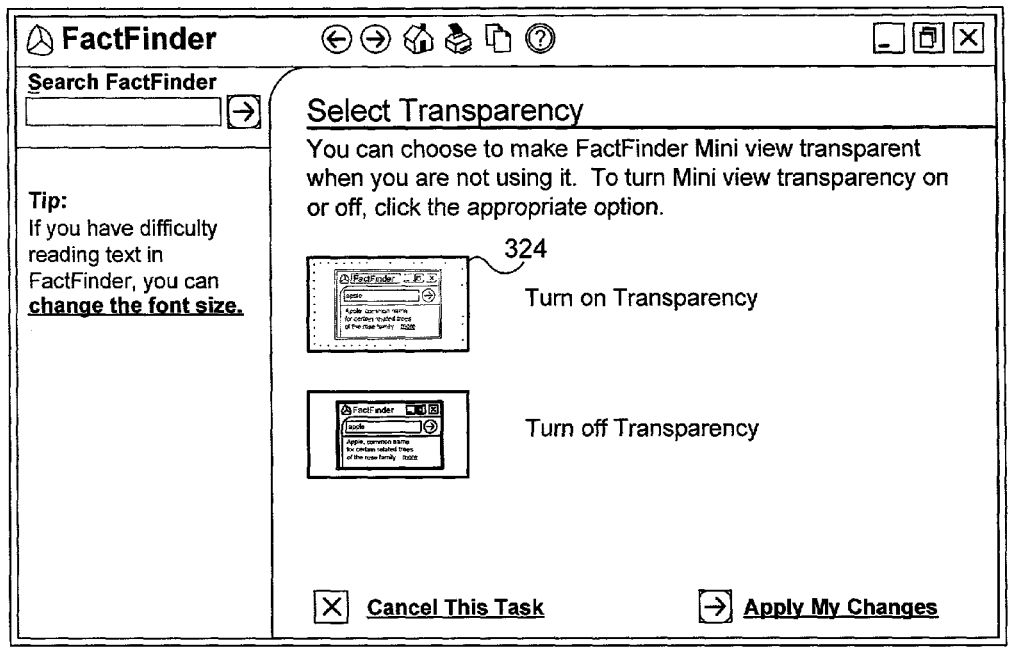
FIG. 16 illustrates a Full view window displaying an option to select a semi-transparency mode for the Mini view window.

FIG. 16 illustrates a Full view window 300f displaying an option to select a semi-transparency mode 324 for the Mini view window. If selected, the Mini view window is preferably set to an optimal semi-transparency (by adjusting an alpha value in the display setting for the window) that enables a user to clearly see and discern text in the Mini view window without obscuring information in any underlying window. Even in semi-transparency mode, the Mini view window will become opaque on a mouse-over event (if the user moves the cursor over the Mini view window), even if the user does not click in the Mini view window. However, a mouse-over event will not change the focus to the Mini view window. The user must click in the Mini view window to change the focus from the currently active window to the Mini view window. Those skilled in the art will recognize that the option may alternatively enable the user to set a variable transparency level, similar to the way the variable hover time is set.

Figure 17:
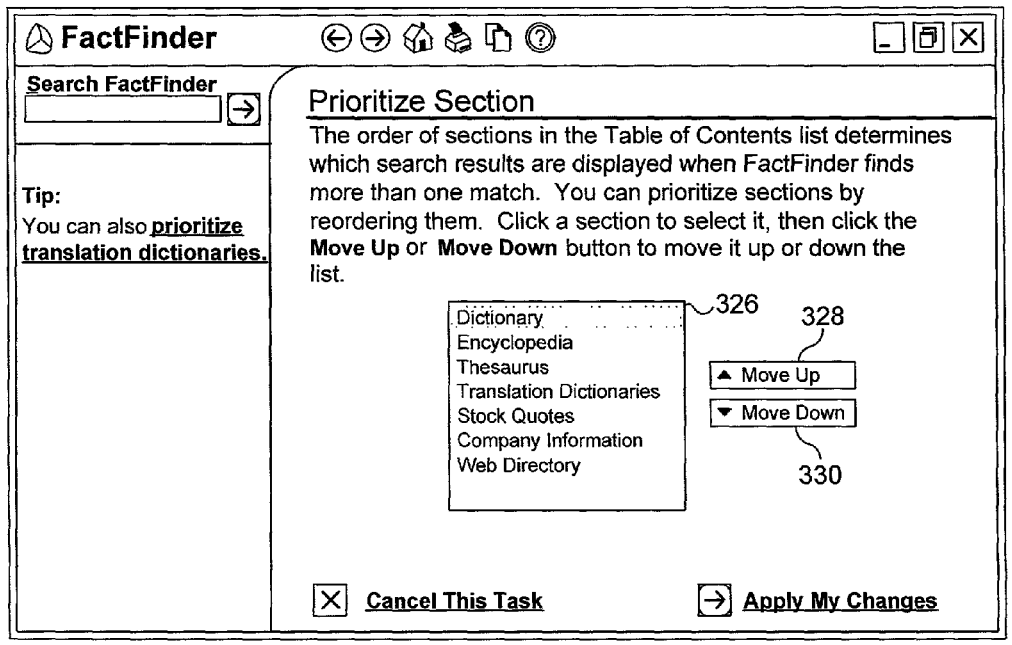
FIG. 17 illustrates a Full view window displaying an option to prioritize a number of sources in which to search for substantive information.

FIG. 17 illustrates a Full view window 300g displaying an option to prioritize a number of sources 326 in which to search for substantive information. The user may reorder the search priority by reordering the list of sources so that the source with the highest priority is first, followed by the source with the next lower priority. The user may promote a source to a higher priority position by selecting the desired source name and pressing a "Move Up" button 328. Conversely, the user may demote a source to a lower priority position by selecting the desired source name and pressing a "Move Down" button 330.

Although the present invention has been described in connection with the preferred form of practicing it and modifications thereto, those of ordinary skill in the art will understand that many other modifications can be made to the present invention within the scope of the claims that follow. For example, the invention can be adapted to detect a location of a wireless pointing device and provide spoken information rather than displaying a window of information on a display screen. The invention could also be adapted to provide a continuous stream of information in a semitransparent window from prioritized sources, such as financial sources, news sources, etc. Accordingly, it is not intended that the scope of the invention in any way be limited by the above description, but instead be determined entirely by reference to the claims that follow.

The invention claimed is:

1. A method for automatically delivering electronic content related to text appearing in a display, comprising the steps of:
    (a) detecting a cursor location within a target window in which the text is displayed;
    (b) defining an update region as a function of the cursor location;
    (c) invalidating the update region such that a target process associated with the target window is caused to re-render the text to the target window in the update region that includes the cursor location;
    (d) determining a primary word that occurs at the cursor location from the re-rendered text;
    (e) searching a first electronic data store for content related to the primary word; and
    (f) displaying a result of the search in a semitransparent window that is persistently visible and that enables content displayed underlying the result to be visible.

2. The method of claim 1, wherein the step of detecting the cursor location comprises one of the steps of:
    (a) receiving only a single cursor move message from a pointing device that controls the cursor location within a predetermined hover time, indicating that the cursor has remained stationary for at least the predetermined hover time, said cursor move message including a coordinate identifying the cursor location; and
    (b) receiving a pointer device click message indicating that a predetermined pointer button was activated while a predetermined key of the user input device is depressed, wherein the pointer click message includes a coordinate identifying the cursor location on the display.

3. The method of claim 1, wherein the step of invalidating the update region, comprises the steps of:
    (a) inserting machine instructions into a memory space of the target process; and
    (b) executing the machine instructions, causing:
        (i) hooking a text-out module;
        (ii) executing the text-out module to re-render the text to the update region; and
        (iii) copying the text from the text-out module while the text-out module is re-rendering the text to the update region.

4. The method of claim 1, wherein the step of determining the primary word that occurs at the cursor location, from the re-rendered text, comprises the steps of:
    (a) determining a character that is closest to the cursor location, from the re-rendered text;
    (b) detecting a first termination point that occurs before the character, wherein the first termination point indicates the beginning of the primary word;
    (c) detecting a second termination point that occurs after the character, wherein the second termination point indicates the end of the primary word; and
    (d) identifying the primary word as a set of characters between the first termination point and the second termination point.

5. The method of claim 1, wherein the step of searching the first electronic data store for content related to the primary word, comprises one of the steps of:
   (a) searching a local electronic data store for content related to the primary word; and
   (b) searching a remote electronic data store for content related to the primary word.

6. The method of claim 1, wherein the step of displaying the result of the search in the semitransparent window, comprises the steps of:
   (a) automatically providing the semitransparent window at a defined location in the display, said semitransparent window being sized to overlay only a portion of the display;
   (b) displaying at least a portion of the result of the search in the semitransparent window; and
   (c) enabling a user to obtain additional content related to the primary word by selecting an option in the semitransparent window.

7. The method of claim 1, further comprising the step of determining a context word associated with the primary word.

8. The method of claim 7, wherein the step of determining the context word comprises one of the steps of:
   (a) determining the context word from the re-rendered text; and
   (b) determining the context word from a characteristic of text being processed by the target process.

9. The method of claim 7, wherein the step of searching the first electronic data store for content related to the primary word, comprises the steps of:
   (a) searching the first electronic data store based on a combination of the primary word and the context word; and
   (b) if no content was found based on the combination of the primary word and the context word, searching the first electronic data store based on the primary word.

10. The method of claim 1, further comprising the step of displaying an alternate word that is spelled similar to the primary word in the result if no content was found based on the primary word.

11. The method of claim 1, further comprising the steps of:
    (a) searching an additional electronic data store for additional content related to the primary word; and
    (b) enabling a user to selectively view the additional content in the result.

12. The method of claim 1, further comprising the steps of:
    (a) enabling a user to selectively indicate that an additional electronic data store is to be searched prior to the first electronic data store, thereby indicating a priority of information desired by the user;
    (b) searching the additional electronic data store for additional content related to the primary word prior to searching the first electronic data store; and
    (c) if additional content is found, displaying at least a portion of the additional content of the search of the additional electronic data store in the semitransparent window prior to displaying the result of the search of the first electronic data store.

13. The method of claim 1, further comprising the step of maintaining a focus on an active window so that the user need not return the focus from the semitransparent window, to the active window after a result is displayed.

14. A machine-readable medium having machine instructions for performing the steps of claim 1.

15. A system for automatically delivering electronic content related to text appearing in a display, comprising:
    (a) a processor;
    (b) a display in communication with the processor, said display displaying a cursor location and a target window that includes text;
    (c) a pointing device adapted to be controlled by a user and coupled in communication with the processor, said pointing device producing a signal indicating the cursor location on the display;
    (d) a user input device having at least one key, said user input device being coupled in communication with the processor; and
    (e) a memory in communication with the processor and storing machine instructions that cause the processor to:
        (i) detect the cursor location indicated by the signal produced by the pointing device on the display device;
        (ii) invalidate an update region, wherein the update region is defined within the target window as a function of the cursor location, such that
        a target process associated with the target window is caused to re-render the text to the target window in the update region of the display that includes the cursor location disposed proximate to the text being re-rendered;
        (iii) determine from the re-rendered text a primary word that is disposed proximate to the cursor location;
        (iv) search a first electronic data store for content related to the primary word; and
        (v) display a result of the search in a semitransparent window that is persistently visible and that enables content of the result to remain visible in the display.

16. The system of claim 15, wherein the machine instructions further cause the processor to do one of:
    (a) receive only a single cursor move message from the pointing device within a predetermined hover time, indicating that the cursor has remained stationary for at least the predetermined hover time, said cursor move message including a coordinate identifying the cursor location; and
    (b) receive a pointer device click message indicating that a predetermined pointer button was activated while a predetermined key of the user input device is depressed, wherein the pointer click message includes a coordinate identifying the cursor location on the display.

17. The system of claim 15, wherein the machine instructions further cause the processor to:
    (a) hook a text-out module included in an operating system executed by the processor;
    (b) execute the text-out module to re-render the text to the update region; and
    (c) copy the text from the text-out module while the text-out module is re-rendering the text to the update region.

18. The system of claim 15, wherein the machine instructions further cause the processor to:
    (a) determine a character that is closest to the cursor location from the re-rendered text;
    (b) detect a first termination point that occurs before the character, wherein the first termination point indicates the beginning of the primary word;

(c) detect a second termination point that occurs after the character, wherein the second termination point indicates the end of the primary word; and (d) identify the primary word as comprising a set of characters between the first termination point and the second termination point.

19. The system of claim 15, wherein the machine instructions further cause the processor to do one of:
    (a) search a local electronic data store for content related to the primary word; and
    (b) search a remote electronic data store for content related to the primary word.

20. The system of claim 15, wherein the machine instructions further cause the processor to:
    (a) automatically provide the semitransparent window at a predefined location in the display, said semitransparent window being sized to overlay only a portion of the display;
    (b) display at least a portion of the result of the search in the semitransparent window; and
    (c) enable a user to selectively obtain additional content related to the primary word by choosing an option provided in the semitransparent window.

21. The system of claim 15, wherein the machine instructions further cause the processor to determine a context word associated with the primary word.

22. The system of claim 21, wherein the machine instructions further cause the processor to do one of:
    (a) determine the context word from the re-rendered text; and
    (b) determine the context word from a characteristic of the text being processed by the target process.

23. The system of claim 21, wherein the machine instructions further cause the processor to:
    (a) search the first electronic data store based on a combination of the primary word and the context word; and
    (b) if no content was found based on the combination of the primary word and the context word, search the first electronic data store based on the primary word.

24. The system of claim 15, wherein if no content was found based on the primary word, the machine instructions further cause the processor to display an alternate word that is spelled similarly to the primary word.

25. The system of claim 15, wherein the machine instructions further cause the processor to:
    (a) search an additional electronic data store for additional content related to the primary word; and
    (b) enable a user to selectively view the additional content.

26. The system of claim 15, wherein the machine instructions further cause the processor to:
    (a) enable a user to indicate that an additional electronic data store is to be searched prior to the first electronic data store, thereby indicating a priority of information desired by the user;
    (b) search the additional electronic data store for additional content related to the primary word prior to searching the first electronic data store; and
    (c) if additional content is found, display at least a portion of the additional content of the search of the additional electronic data store in the semitransparent window, prior to displaying the result of the search of the first electronic data store.

27. The system of claim 15, wherein the machine instructions further cause the processor to maintain a focus on an active window so that a user need not return the focus from the semitransparent window, to the active window after the result is displayed.

28. A method for capturing data displayed near a cursor location controlled with a pointing device in an electronic display, comprising the steps of:
    (a) hooking into an operating system output module that renders data to the electronic display;
    (b) defining an update region as a function of the cursor location in the electronic display;
    (c) invalidating the update region of the electronic display, such that
    the operating system output module is forced to re-render the data to the update region of the electronic display; and
    (d) copying the data from the operating system output module while the operating system output module is re-rendering the data to the update region of the electronic display.

29. The method of claim 28, wherein the step of hooking into the operating system output module comprises the step of patching an .idata section associated with a target process that controls the electronic display.

30. The method of claim 28, wherein the operating system output module is forced to re-render the data to the update region by invoking a redraw application programming interface that instructs the operating system to issue a paint message to a procedure for redrawing the electronic display, said paint message causing the procedure to execute the operating system output module to redraw the update region of the electronic display window.

31. The method of claim 28, wherein the step of copying the data from the operating system output module while the operating system output module is re-rendering comprises the steps of:
    (a) mapping font glyphs to text if the data comprises font glyphs;
    (b) mapping text coordinates to screen coordinates if the operating system output module provides the data to a window device context; and
    (c) saving the data if the operating system output module provides the data to a memory device context.

32. A machine-readable medium having machine instructions for carrying out the steps of claim 28.

33. A system for capturing data displayed near a cursor location in an electronic display, comprising:
    (a) a processor;
    (b) a display in communication with the processor, said display displaying a cursor at a location in the display; and
    (c) a memory in communication with the processor and storing machine instructions that cause the processor to:
        (i) hook into an operating system output module that renders data to the electronic display;
        (ii) define an update region as a function of the cursor location in the electronic display;
        (iii) invalidate the update region of the electronic display, wherein the update region is defined as a function of the cursor location in the electronic display such that the operating system output module is forced to re-render the data to the update region of the electronic display; and
        (iv) copy the data from the operating system output module while the operating system output module is re-rendering the data to the update region of the electronic display.

34. The system of claim 33, wherein the machine instructions further cause the processor to patch an .idata section associated with a target process that controls the electronic display.

35. The system of claim 33, wherein the machine instructions further cause the processor to invoke a redraw application programming interface that instructs the operating system to immediately issue a paint message to a procedure of the electronic display, said paint message causing the procedure to execute the operating system output module to redraw the update region of the electronic display.

36. The system of claim 33, wherein the machine instructions further cause the processor to:
   (a) map font glyphs to text if the data comprises font glyphs;
   (b) map text coordinates to screen coordinates if the operating system output module provides the data to a window device context; and
   (c) save the data if the operating system output module provides the data to a memory device context.

* * * * *